US 8,392,501 B2
Mar. 5, 2013

(12) United States Patent
Foti

(10) Patent No.: US 8,392,501 B2
(45) Date of Patent: Mar. 5, 2013

(54) METHODS AND SYSTEMS FOR RESUMING, TRANSFERRING OR COPYING A MULTIMEDIA SESSION

(75) Inventor: George Foti, Dollard des Ormeaux (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/220,173

(22) Filed: Aug. 29, 2011

(65) Prior Publication Data
US 2011/0314134 A1 Dec. 22, 2011

Related U.S. Application Data

(63) Continuation of application No. 12/355,351, filed on Jan. 16, 2009, now Pat. No. 8,032,589.

(60) Provisional application No. 61/108,710, filed on Oct. 27, 2008, provisional application No. 61/118,453, filed on Nov. 27, 2008, provisional application No. 61/119,469, filed on Dec. 3, 2008.

(51) Int. Cl.
G06F 15/173 (2006.01)
(52) U.S. Cl. ........ 709/203; 709/220; 709/224; 709/228; 707/102
(58) Field of Classification Search .................. 709/203, 709/220, 224, 228; 707/102
See application file for complete search history.

(56) References Cited

U.S. PATENT DOCUMENTS

| 7,086,591 | B2* | 8/2006 | Anderson | 235/384 |
|---|---|---|---|---|
| 7,320,034 | B2* | 1/2008 | Fichou et al. | 709/227 |
| 8,032,589 | B2* | 10/2011 | Foti | 709/203 |
| 2004/0035928 | A1* | 2/2004 | Anderson | 235/385 |
| 2004/0088412 | A1* | 5/2004 | John et al. | 709/226 |
| 2005/0252959 | A1 | 11/2005 | Gaumond et al. | |
| 2006/0171309 | A1 | 8/2006 | Chen et al. | |
| 2007/0027896 | A1* | 2/2007 | Newport et al. | 707/102 |
| 2007/0083910 | A1 | 4/2007 | Haneef et al. | |
| 2008/0071859 | A1* | 3/2008 | Seed et al. | 709/203 |
| 2008/0084867 | A1 | 4/2008 | Foti et al. | |
| 2008/0151918 | A1 | 6/2008 | Foti | |
| 2008/0155062 | A1 | 6/2008 | Rabold et al. | |
| 2010/0106608 | A1* | 4/2010 | Menendez et al. | 705/17 |
| 2011/0196973 | A1* | 8/2011 | Shaheen et al. | 709/228 |

FOREIGN PATENT DOCUMENTS

| EP | 1926319 A2 | 5/2008 |
|---|---|---|
| WO | 2006090340 A1 | 8/2006 |

OTHER PUBLICATIONS

H. Schulzrinne et al., Real Time Streaming Protocol (RTSP), Network Working Group, RFC 2326, Apr. 1998. pp. 01-92.
J. Rosenberg et al., SIP: Session Initiation Protocol, Network Working Group, RFC 3261, Jun. 2002. pp. 01-269.
3GPP TS 23.228 V7.4.0, 3rd Generation Partnership Project; Technical Specification Group Services and System Aspects; IP Multimedia Subsystem (IMS); Stage 2 (Release 7), Jun. 2006. pp. 01-197.
3GPP TS 23.228 V8.0.0, 3rd Generation Partnership Project; Technical Specification Group Services and System Aspects; IP Multimedia Subsystem (IMS); Stage 2 (Release 8), Mar. 2007.pp. 01-224.

(Continued)

Primary Examiner — Khanh Dinh
(74) Attorney, Agent, or Firm — Dilip C. Andrade; Ericsson Canada Inc.

(57) ABSTRACT

Methods and systems for resuming, transferring or copying an IMS session associated with a first terminal or user at a second terminal in e.g., a same household are described. If a session is to be transferred, resource reservations associated with establishing a second IMS session for the transfer can be bypassed by informing the IMS system, either explicitly or implicitly, of the relationship between the terminals involved in the transfer. A controller can select a content server to support the resumed session and coordinate session identities associated with the selection.

13 Claims, 17 Drawing Sheets

OTHER PUBLICATIONS

3GPP TS 33.203 V7.2.0, 3rd Generation Partnership Project; Technical Specification Group Services and System Aspects; 3G security; Access security for IP-based services (Release 7), Jun. 2006. pp. 01-65.

* cited by examiner

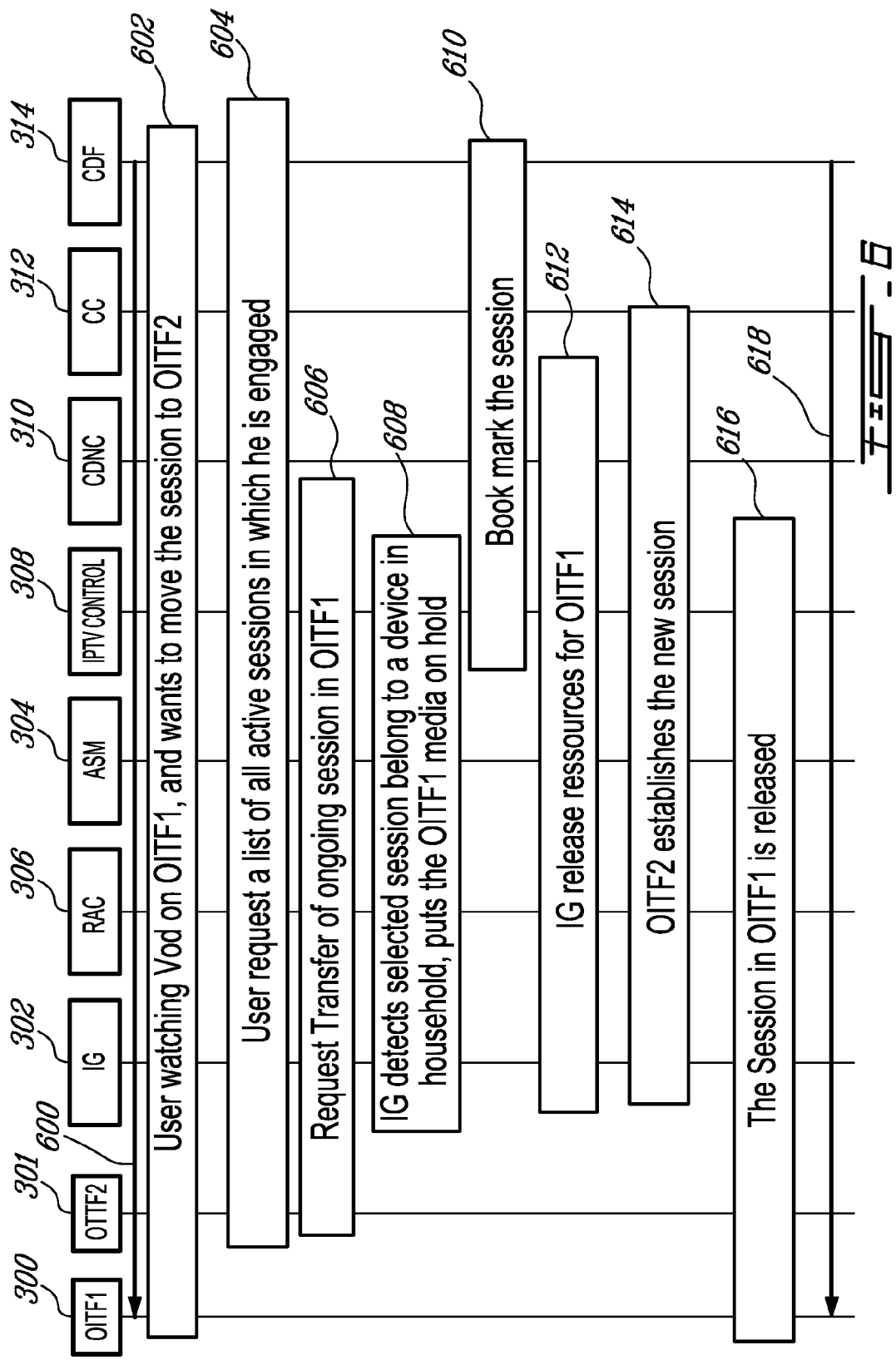

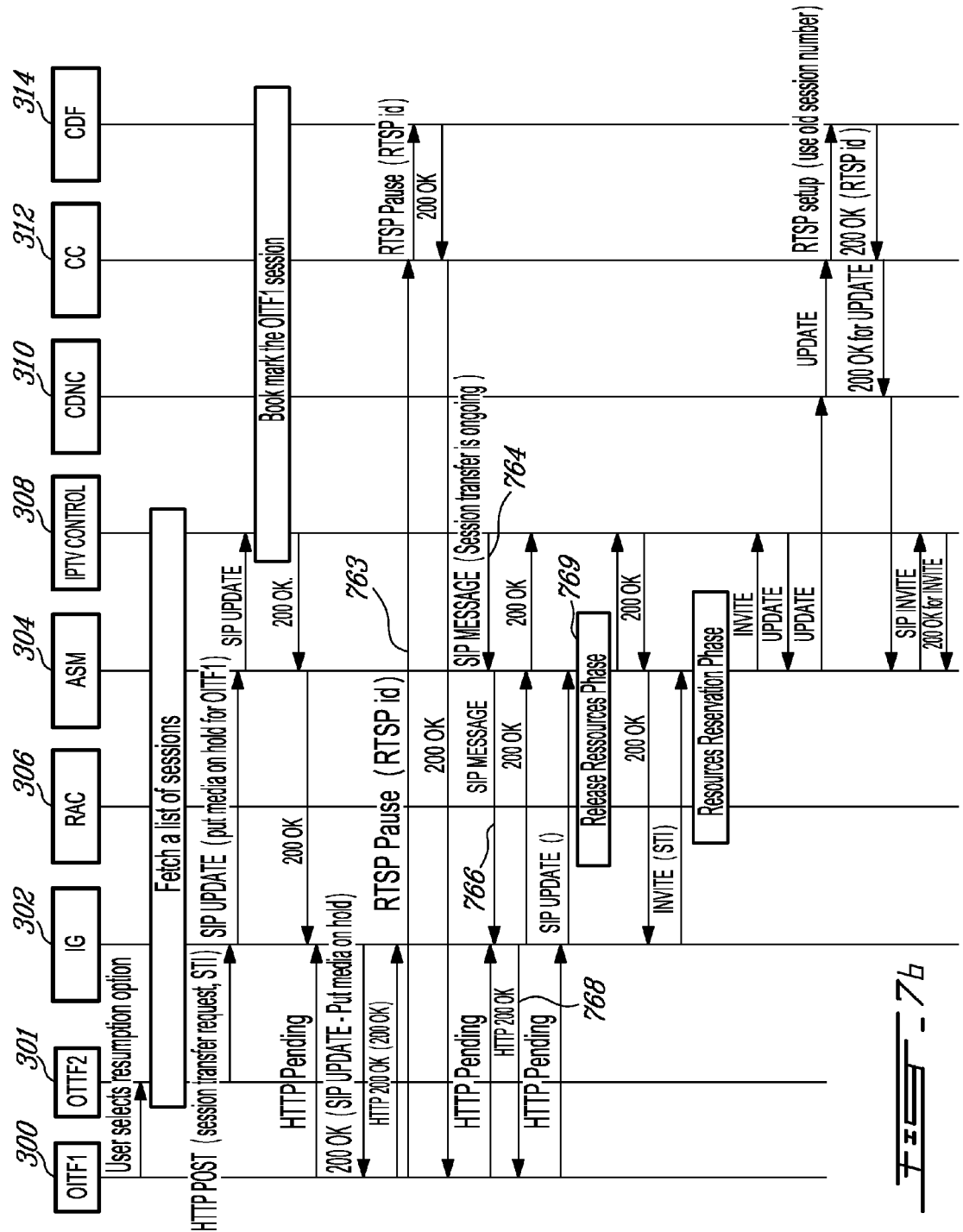

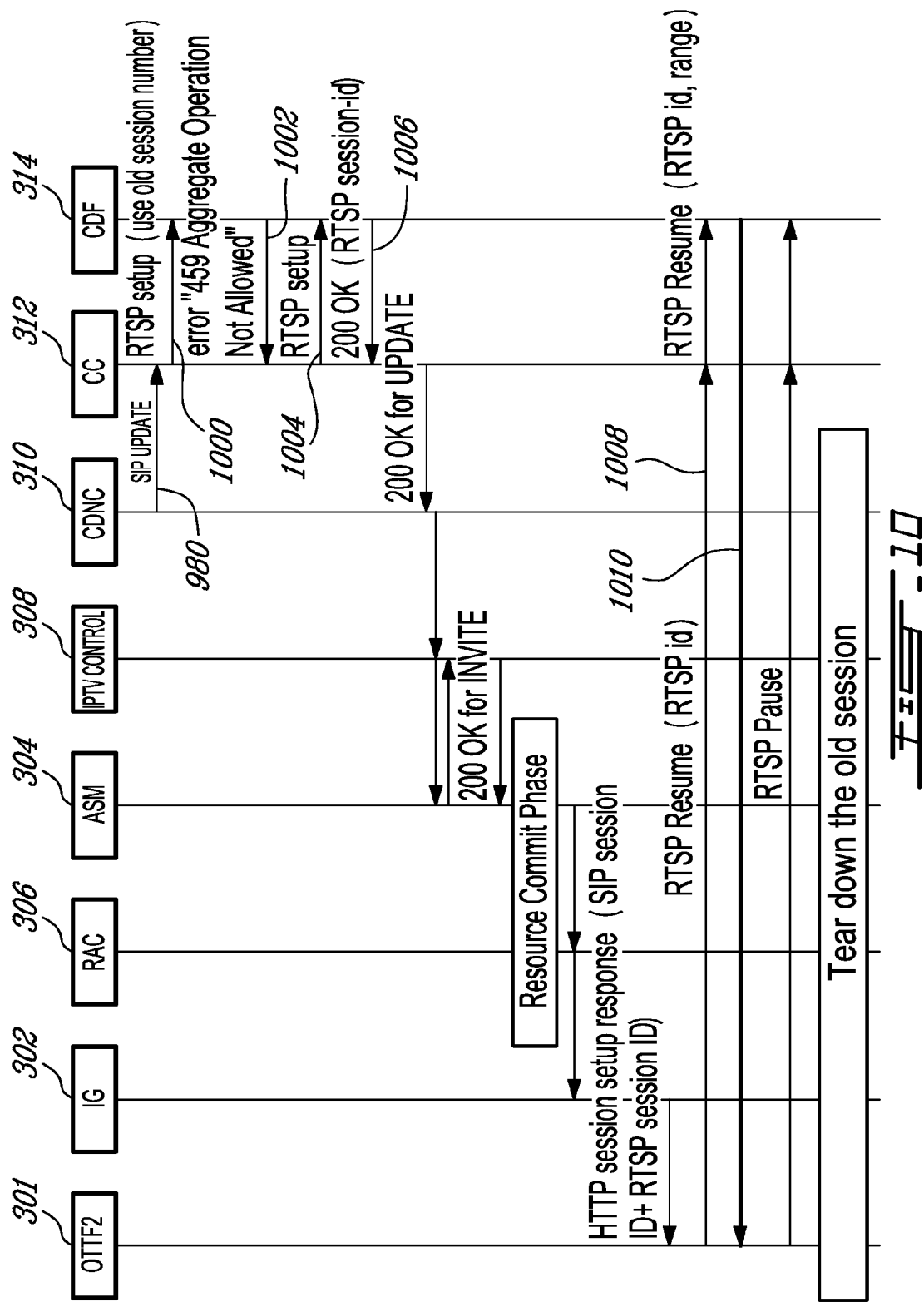

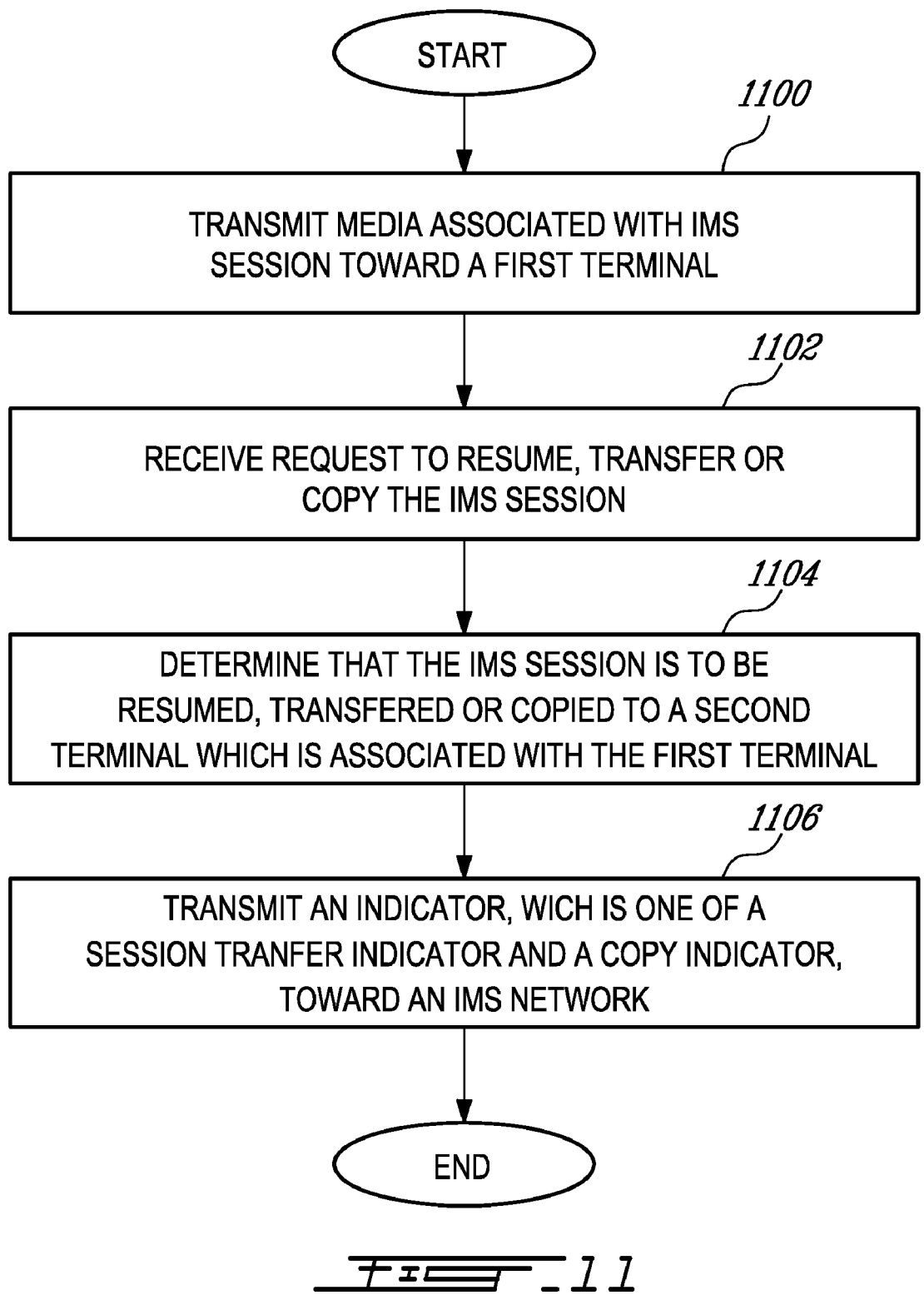

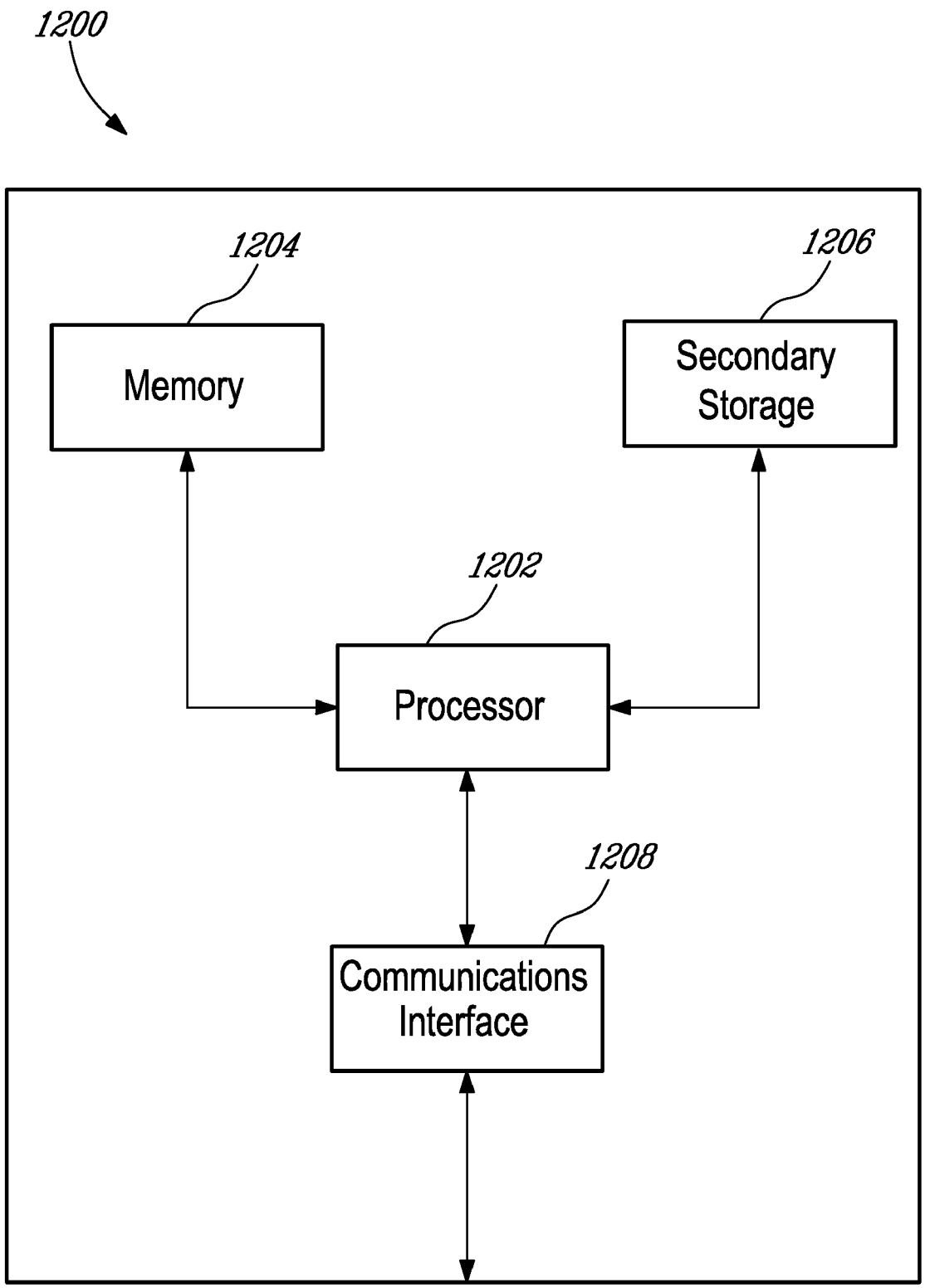

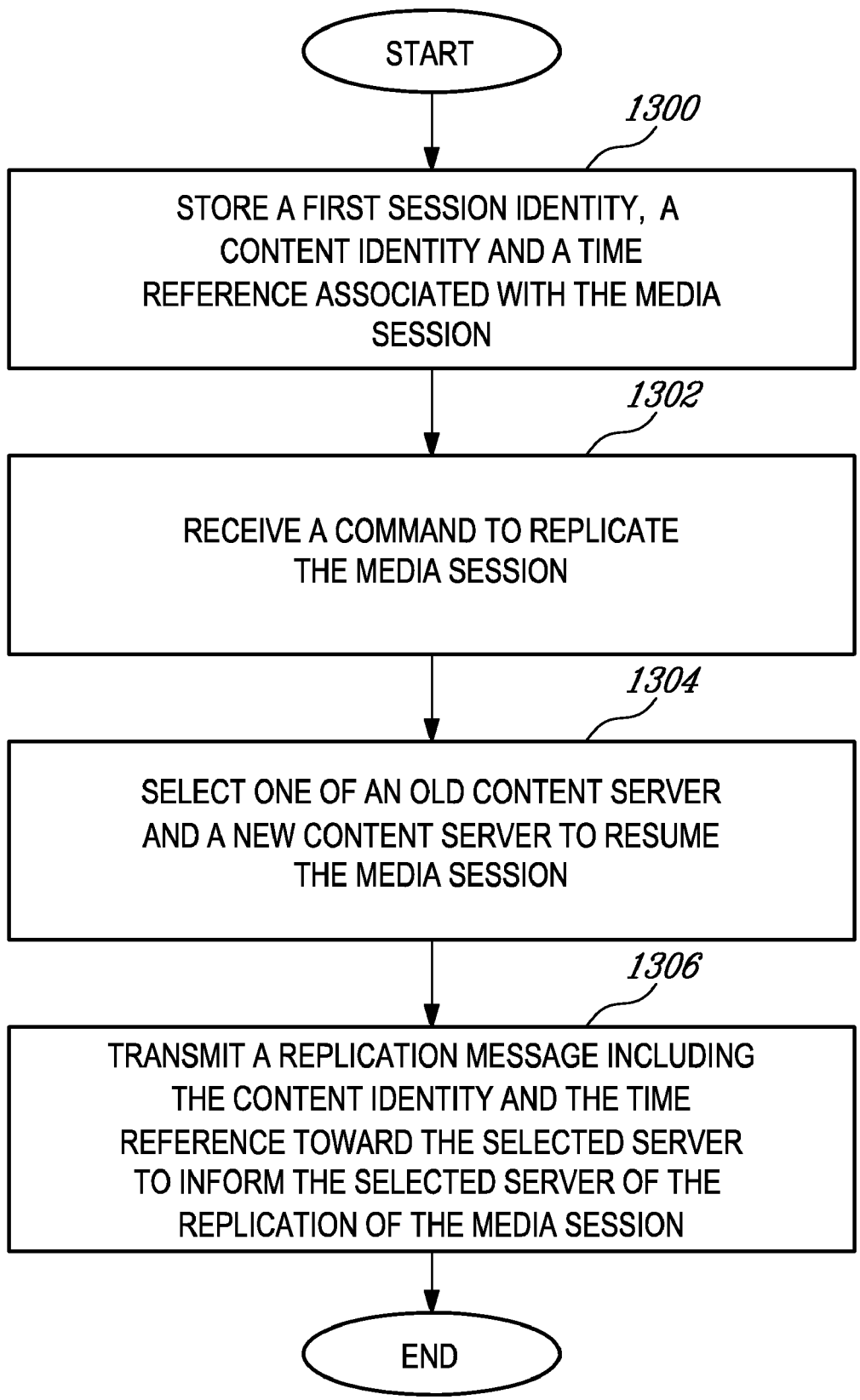

METHODS AND SYSTEMS FOR RESUMING, TRANSFERRING OR COPYING A MULTIMEDIA SESSION

RELATED APPLICATIONS

This application is related to, and claims priority from, U.S. Provisional Patent Application Ser. No. 61/108,710, filed on Oct. 27, 2008, entitled "Video On Demand Resumption from a Different IPTV Terminal", to George Foti, U.S. Provisional Patent Application Ser. No. 61/118,453, filed on Nov. 27, 2008, entitled "Video On Demand Resumption from a Different IPTV Terminal", to George Foti, and U.S. Provisional Patent Application Ser. No. 61/119,469, filed on Dec. 3, 2008, entitled "Video On Demand Resumption from a Different IPTV Terminal" to George Foti, the entire disclosure of each of which is incorporated here by reference. Furthermore, this application is a continuation application of U.S. patent application Ser. No. 12/355,351 filed on Jan. 16, 2009.

TECHNICAL FIELD

This application is related, generally, to methods and systems for resuming, transferring or copying a multimedia session on the same or a different end user terminal device.

BACKGROUND

Internet Protocol (IP) Multimedia Subsystem (IMS) based IP Television (IPTV) is a new service that is currently being introduced within a service layer of an IMS network. An IMS specification '3GPP TS 23.228 v7.4.0 (2006-06) "3rd Generation Partnership Project; Technical Specification Group Services and System Aspects; IP Multimedia Subsystem (IMS); Stage 2 (Release 7)"' provides service descriptions for the IMS core network. The IMS core network in turn includes elements necessary to support IP multimedia services. Another IMS specification '3GPP TS 33.203 v7.2.0 (2006-06) "3rd Generation Partnership Project; Technical Specification Group Services and System Aspects; 3G security; Access security for IP-based services (Release 7)"' provides authentication mechanisms that are useful in ensuring validity of requests received from terminals for obtaining multimedia services such as IPTV.

FIG. 1 illustrates a high-level view of a typical IMS network architecture for supporting IPTV and other multimedia applications. A service network 100 is shown comprising a first terminal 110 and a second terminal 120, both capable of being used by end-users to enjoy IPTV and other multimedia contents. Contents are provided to the terminals 110, 120 by a content server 130. The content server 130 acts as an aggregator of information and may comprise video, audio, games, photos, text, etc. These different types of media are generally stored on a hard drive at the content server 130. In the service network 100, contents are sent by the content server 130 by use of Real-Time Streaming Protocol (RTSP) media flows 140. RTSP is used in this exemplary architecture for media manipulation and control, while SIP is used for session setup. RTSP is defined by the Internet Engineering Task Force (IETF) in 'Request For Comments (RFC) 2326 "Real Time Streaming Protocol (RTSP)", April 1998'. Multimedia sessions are set up between the terminals 110, 120 and the content server 130 by use of an application server 150. The application server (AS) 150 runs software functions to control setting up of sessions between the terminals 110, 120 and the content server 130. For example, the AS 150 maps SIP to the appropriate RTSP message for RTSP session set up. Additionally, among other things, the AS 150 may handle authentication of users, billing of sessions, selection of one amongst several content servers 130 based on performance parameters, and the like. Set up of sessions is made by use of SIP messages exchanged on signaling links 160. The IETF defines SIP messages in 'RFC 3261 "SIP: Session Initiation Protocol", June 2002'.

One anticipated usage for the system shown in FIG. 1 involves transferring a multimedia session from one terminal to the other. Suppose, for example, that a user is watching a video-on-demand (VOD) program on terminal 110 in his or her living room, and wants to relocate to the kitchen to prepare a meal and continue watching the same VOD program on terminal 120. In that case, it would be desirable to have a mechanism for pausing the VOD program on the server side and providing a multimedia session on terminal 120 which enables the user to restart that VOD program at the point in time at which it was paused.

One solution for addressing this situation is described in U.S. Patent Publication No. 2008/0084867, the disclosure of which is incorporated herein by reference. Therein, in FIG. 2 (replicated herein) a sequence diagram illustrating a method for transferring a session from a first terminal 110 to a second terminal 120 is illustrated. In this exemplary sequence diagram, a session has been set up by a service network 100 between the first terminal 110 and a Content Serving Function (CSF) 132 located in the content server 130. At the time of setting up the session, a session identity has been stored in the first terminal 110.

As mentioned above, assume that a VOD program (or some other content) is being transmitted from the CSF 132 to the first terminal 110 at step 200, and that the end user wants to transfer that session to second terminal 120. At step 202, responsive to a user input, the first terminal 110 sends a pause message towards the CSF 132. The pause message may preferably comprise the session identity. The CSF 132 pauses transmission of the media stream at step 204, using the session identity to specifically pause one session where more than one session is currently active for the same user. The first terminal then sends, at step 206, a correlation message comprising the session identity for the session currently being paused, towards the ASF 152. At step 208, the ASF 152 stores the session identity, if not already known to the ASF 152, and takes note that the session is currently being paused by storing a session status set to inactive. Where more than one session is currently active for the same user, the session identity received in the correlation message is used by the ASF 152 to specifically point to the session that is being paused.

Thereafter, responsive to an input from the user, the second terminal 120 sends a context request message towards the ASF 152 at step 210. The ASF 152 replies at step 212 by sending a context response message comprising one or more session identities towards the second terminal 120. At step 210, the ASF 152 may have session identities corresponding to one or more sessions for the user of the first and second terminals 120, each session having been paused in a manner similar to that shown at steps 202-208. In that case, the context response message sent at step 212 may comprise session identities for all sessions related to the user. At step 214, the user may optionally select to resume the paused session from the second terminal 120. This step may comprise selection by the user of one or more sessions to be resumed, based on session information received in the context response message. At step 216, the second terminal sends a resume message towards the CSF 132. The resume message comprises RTSP session identities for one or more sessions selected by the user or automatically selected by the second terminal 120. At step 218, the CSF 132 resumes sending the content towards the second terminal 120.

In addition to the solution described in this U.S. Patent Publication, it would further be desirable to be able to transfer multimedia sessions between, or resume a multimedia session at, terminals which are connected to IMS gateways or which have their own IMS software stacks.

SUMMARY

According to an exemplary embodiment, a method for resuming an IMS session and corresponding media delivery includes transmitting media toward a first terminal, receiving a request to resume, transfer or copy the IMS session, determining that the IMS session is to be resumed, transferred or copied to a second terminal which is associated with the first terminal, and transmitting an indicator, which is one of a session transfer indicator and a copy indicator, toward an IMS network.

According to another exemplary embodiment, a system includes a first node including a processor for receiving and forwarding media associated with an IMS session toward a first terminal, and an interface for receiving a request to resume, transfer or copy the IMS session, wherein the processor determines that the IMS session is to be resumed, transferred or copied to a second terminal which is associated with the first terminal and transmits an indicator, which is one of a session transfer indicator and a copy indicator, toward an IMS network.

According to yet another exemplary embodiment, a method for replicating a media session includes storing a first session identity, a content identity and a time reference associated with the media session, receiving a command to replicate the media session, selecting one of: a content server which previously supplied content associated with the media session and a new content server, to replicate the media session, and transmitting a replication message including the content identity and the time reference toward the selected one of the content server which previously supplied content associated with the media session and the new content server which informs the selected server of replication of the media session.

According to still another exemplary embodiment, a system includes a first node including a memory device for storing a first session identity, a content identity and a time reference associated with a media session, and a processor for receiving a command to replicate the media session, selecting one of: a content server which previously supplied content associated with the media session and a new content server, to replicate the media session; and transmitting a replication message including the content identity and the time reference toward the selected one of the content server which previously supplied content associated with the media session and the new content server which informs the selected server of replication of the media session.

BRIEF DESCRIPTION OF THE DRAWINGS

The accompanying drawings illustrate exemplary embodiments of the present invention, wherein:

FIGS. 6 and 7(*a*) illustrate signaling associated with resuming or transferring a session according to another exemplary embodiment;

FIGS. 7(*b*) and 7(*c*) illustrate signaling associated with resuming or transferring a session according to another exemplary embodiment;

FIG. 10 illustrates signaling associated with resuming or transferring a session according to another exemplary embodiment;

FIG. 11 is a flowchart depicting a method for resuming or transferring an IMS session according to an exemplary embodiment;

FIG. 12 is a communication node according to an exemplary embodiment; and

FIG. 13 is a flowchart depicting a method for resuming, transferring or copying a media session according to another exemplary embodiment.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
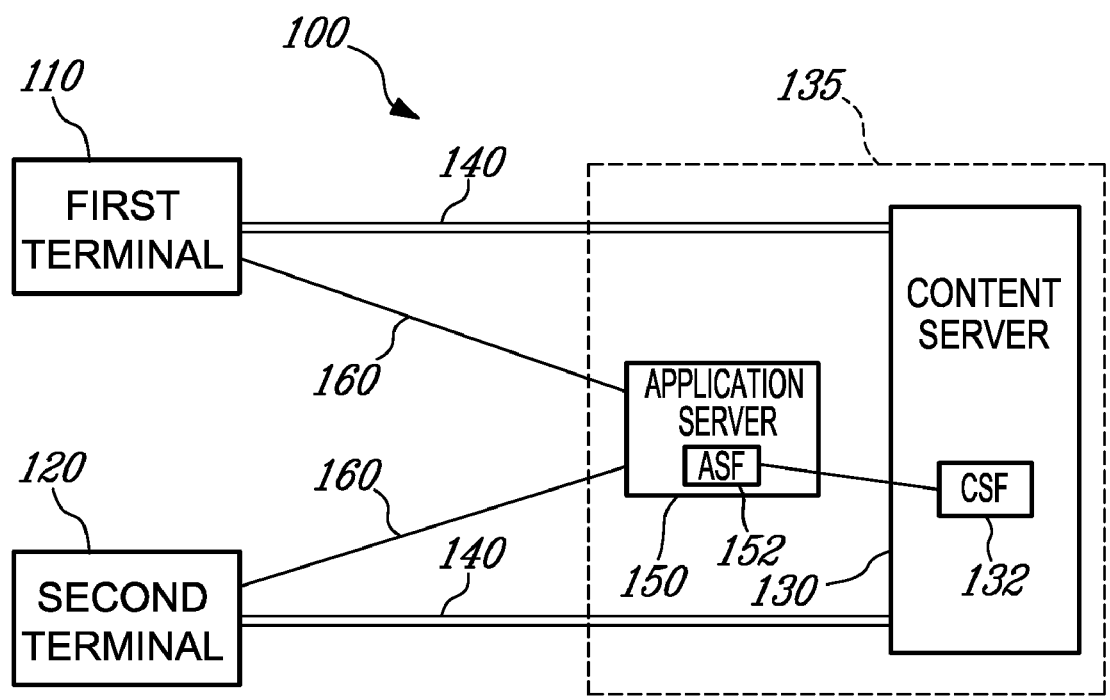
FIG. 1 depicts a conventional architecture having two terminals disposed in a common location and a content serving system connected thereto.
Figure 2:
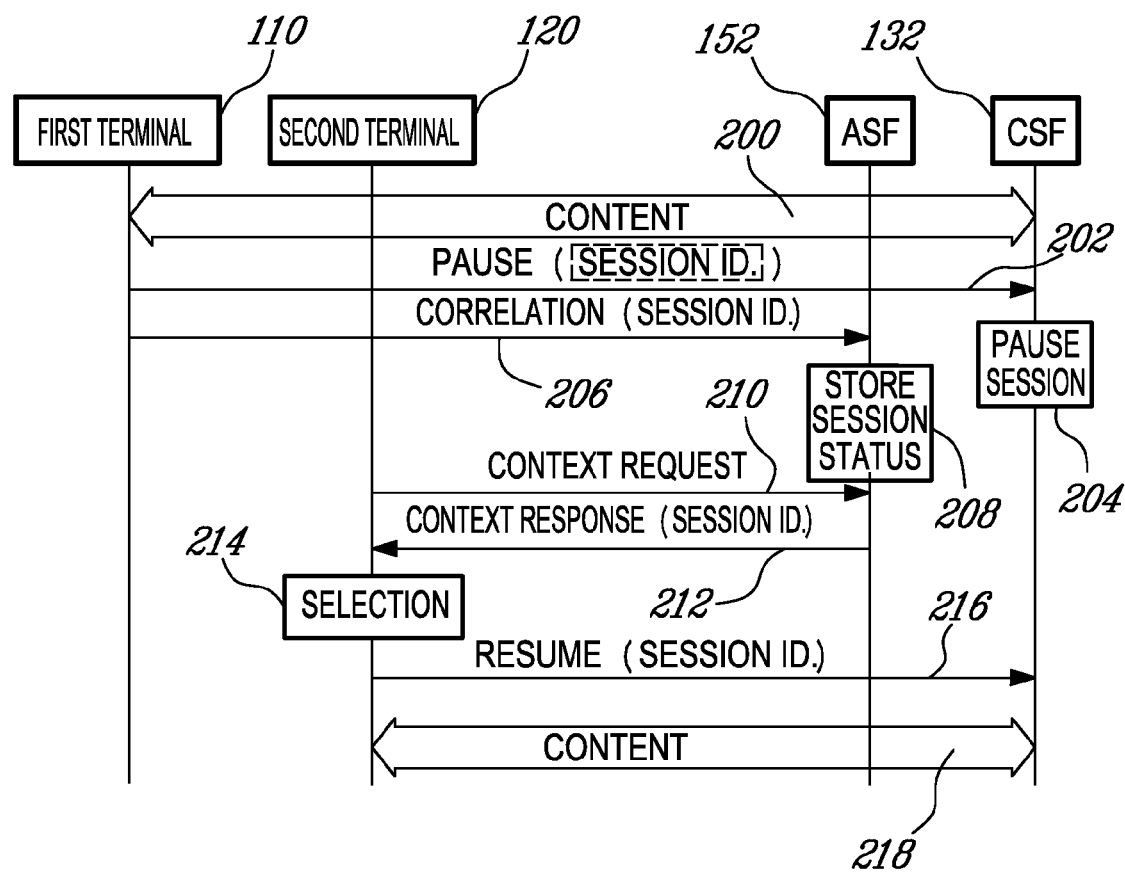
FIG. 2 is a signaling diagram illustrating conventional signaling associated with transferring the session between the two terminals of FIG. 1.
Figure 3:
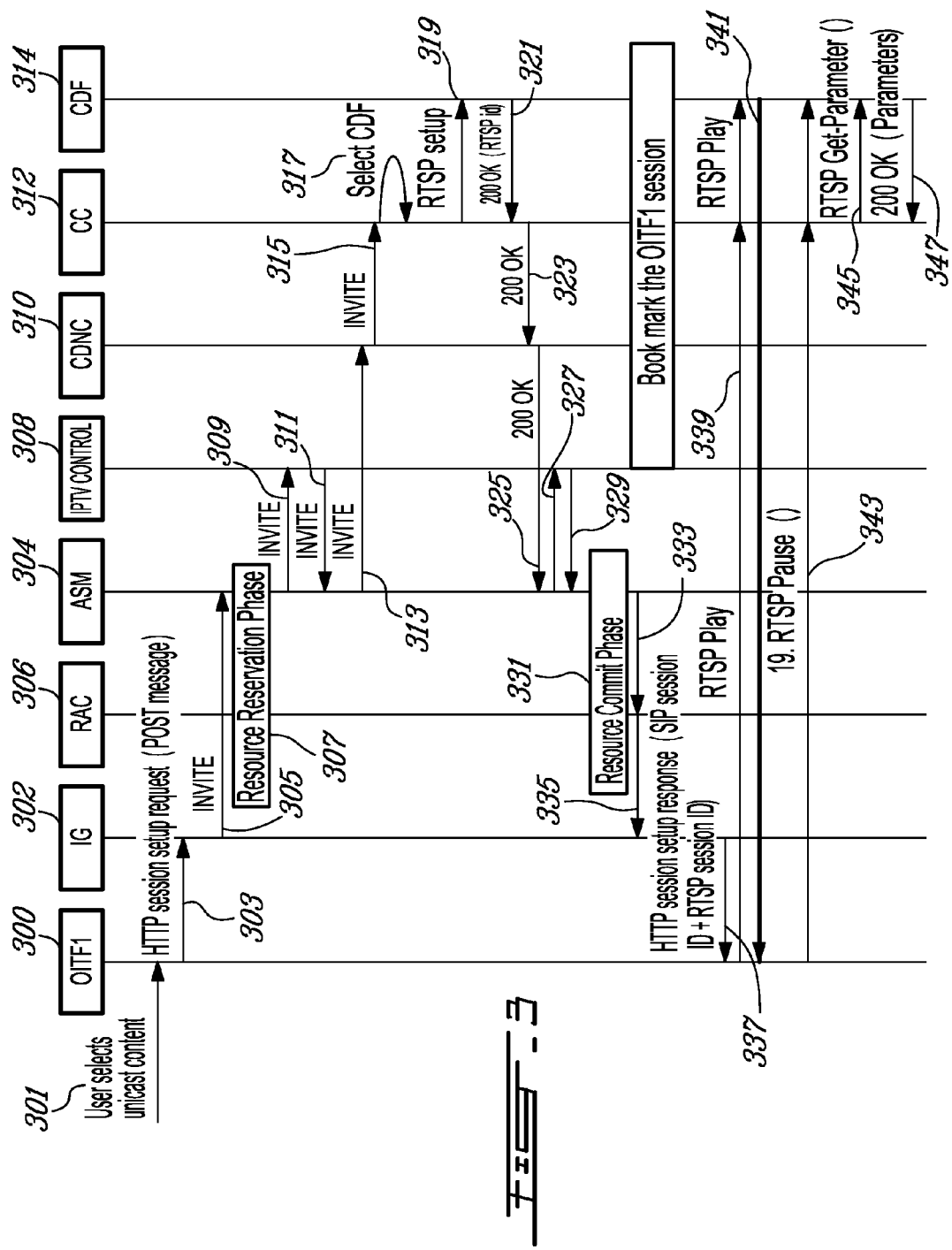
FIG. 3 is a signaling diagram illustrating an initial setup of a content-on-delivery (COD) session.

In order to provide some context for the discussion of the exemplary embodiments, signaling which can be used to establish an exemplary VOD connection, or more generally any content-on-demand (COD) connection, in an IMS communication network is illustrated in FIG. 3. Therein, as shown by step 301, initially a user selects some content via an end user device 300, e.g., an Open IPTV Terminal Function (OITF). The OITF1 300 acquires any necessary information to make a Session Description Protocol (SDP) offer, including, for example, IP addresses and ports for media delivery and/or locators. The OITF1 300 uses this information to send an HTTP session setup request 303 (POST message) to an IMS Gateway (IG) 302 which requests a connection to the selected media or content stream. The IG 302, which can, for example, be a gateway device located in the user's home, translates the HTTP request 303 which it receives into a corresponding Session Initiation Protocol (SIP) INVITE message suitable for use in communicating with an IMS network. The IG 302 then transmits this INVITE signal 305 to the IMS network, represented in FIG. 3 by the Authentication and Session Management (ASM) entity 304.

As will be appreciated by those skilled in the art, IMS is an architectural framework utilized for delivering IP multimedia services to an end user. The IMS architecture has evolved into a service-independent topology which uses IP protocols, e.g., SIP signaling, to provide a convergence mechanism for disparate systems. In part this is accomplished via the provision of a horizontal control layer which isolates the access network from the service layer. Among other things, IMS architectures may provide a useful platform for the rollout of IPTV systems and services. More detail regarding IMS architecture generally and SIP signaling can be found in the Third Generation Partnership Project (3GPP) Technical Specification (TS) 23.228 Version 8 dated March 2007 and Request for Comments (RFC) 3261 dated June 2002, respectively. In these exemplary embodiments, each end user device 300 or OITF to which a session may be transferred or copied, or from which a session may be resumed, is either connected to an IMS Gateway 302, or is itself IMS-capable, e.g., an IMS capable mobile device having an IMS software stack.

Thus, the ASM entity 304 will, in conjunction with the Resource and Admission Control (RAC) entity 306, establish an IMS session in response to the received SIP INVITE message 305, as denoted by Resource Reservation Phase 307. As will be appreciated by those skilled in the art, the RAC entity 306 can include, for example, an Access-Resource and Admission Control Function (A-RACF) and a Service-based Policy Decision Function (SPDF). The RAC entity 306 provides an interface for transport control services, e.g., resource reservation, at a certain time for a specific application. More specifically, the A-RACF supports admission control and network policy assembly, whereas the SPDF is a logical policy decision element and performs functions, such as receiving and checking resource request information.

Once the IMS session has been established between the OITF1 300 and the IMS network, the ASM entity 304 sends a SIP INVITE 309 message to IPTV control unit 308 requesting the desired media. The IPTV control unit 308 validates the request and, assuming that the validation is successful, selects an appropriate content delivery network controller (CDNC) 310 to provide the requested media. This information is relayed back to the ASM entity 304 as SIP INVITE message 311, which then directs its request toward the selected CDNC 310 via SIP INVITE message 313. The CDNC 310, in turn, sends a SIP INVITE message containing instructions to stream the requested media to cluster controller 312. The cluster controller (CC) 312 selects a server, represented by content delivery function (CDF) 314, on which the requested media is actually stored (block 317) and sets up a Real Time Streaming Protocol (RSTP) session 319 with that CDF 314. This may involve, for example, SIP to RTSP conversion for the session setup aspects of the media delivery by the CC 312.

Once the RTSP session is setup with the CDF 314 to support the delivery of the requested media, the CDF 314 returns an acknowledgment message 321 including an identifier associated with the created RTSP session. The CC 312 stores the RTSP id which the CC 312 receives from the CDF 314, e.g., in its state memory (not shown), and returns its own RTSP id to the OITF1 300 in the subsequent acknowledgement signaling, described below. The CC 312 establishes a binding between the 2 RTSP ids, i.e., the first RTSP id value received from the CDF 314 and the second RTSP id value which it selects and forwards through the network to OITF1 300. In most cases this second RTSP id will be the RTSP id value with which OITF1 300 was initially viewing the program which is being resumed. According to exemplary embodiments described below, this capability of the CC 312 can be used to allow the OITF1 300 to continue to use the RTSP id which it had used previously when viewing the program being resumed, while also providing the CC 312 with the flexibility to (optionally) change the CDF 314 which will supply the resumed program and create a new RTSP with a new session id that the CC 312 can later bind to the RTSP id which it has returned to the OITF1 300.

This acknowledgement (with the second RTSP id value) is promulgated back through the network to the CDNC 310 (via signal 323), then to the ASM 304 (via signal 325), and then to IPTV control unit 308 (via signal 327). At this point, the IPTV control unit 308 signals to the IMS network that the delivery network is ready to deliver the requested content via signal 329 and the IMS network enters the resource commit phase 331. For example, the ASM 304 signals to the RAC entity 306 (via signal 333) that it would now like to commit the resources (e.g., the bandwidth on the communication link between the DSLAM (not shown) and the household in which OITF1 300 resides) that were previously reserved for this connection during the resource reservation phase 307. The RAC entity 306, in turn, signals to the IG 302 (via signal 335) that this bandwidth has been allocated to the OITF1 300 for providing the requested media. The IG 302 sends an HTTP session setup response message 337 to the OITF1 300 including the SIP session ID associated with the IMS session and the RTSP session ID associated with the media delivery session. The OITF1 300 sends an RTSP play message 339 back through the network to the CDF 314, which then delivers the requested content or media as indicated by arrow 341.

As mentioned above, one usage case of interest for VOD service, or the like, involves the case where a user pauses a running VOD program on one terminal and moves to another room in a household wherein he or she wants to resume watching the same program at the point where it was paused, but on another terminal. This terminal can be in the same household in another room, in a different location, or even be a mobile device as along as the user is registered on that terminal on which he wants to resume the paused session. This is also described herein as transferring a multimedia session. For example, as shown in FIG. 3, in response to a user actuating a remote control device to pause a program, the OITF1 300 can send an RTSP Pause message 343 through the network nodes toward CDF 314. The CC 312 may query the CDF 314 for the current time value or counter value of the program to store the state of the paused program via signals 345 and 347. The following exemplary embodiments illustrate various mechanisms and signaling for resuming the paused VOD program, or the like, at another terminal. However, these exemplary embodiments are equally applicable to pausing the session and resuming it on the same terminal, as well as to copying the session to a second terminal without pausing it on the first, as will be described in more detail below.

According to a first exemplary embodiment, resumption of the paused media or content can be accomplished by transferring the IMS session to the second, new terminal using a pull mechanism. According to this first exemplary embodiment, a change is made to the IMS specification to provide for a session transfer indicator which can be inserted into the signaling request by the IG 302. This session transfer indicator enables the ASM entity 304 (and more specifically the Proxy Call Session Control Function (P-CSCF)) to explicitly detect that the IMS session being transferred to the second, new terminal is in the same household as the first, old terminal from which the "pulling" of the session is to occur. This, in turn, enables the P-CSCF to bypass the IMS resource reservation when it receives the corresponding SIP INVITE message that includes the indicator and, instead, to perform resource allocation later when the corresponding 200 OK acknowledgement message is received, after the original session has been torn down.

Figure 4:
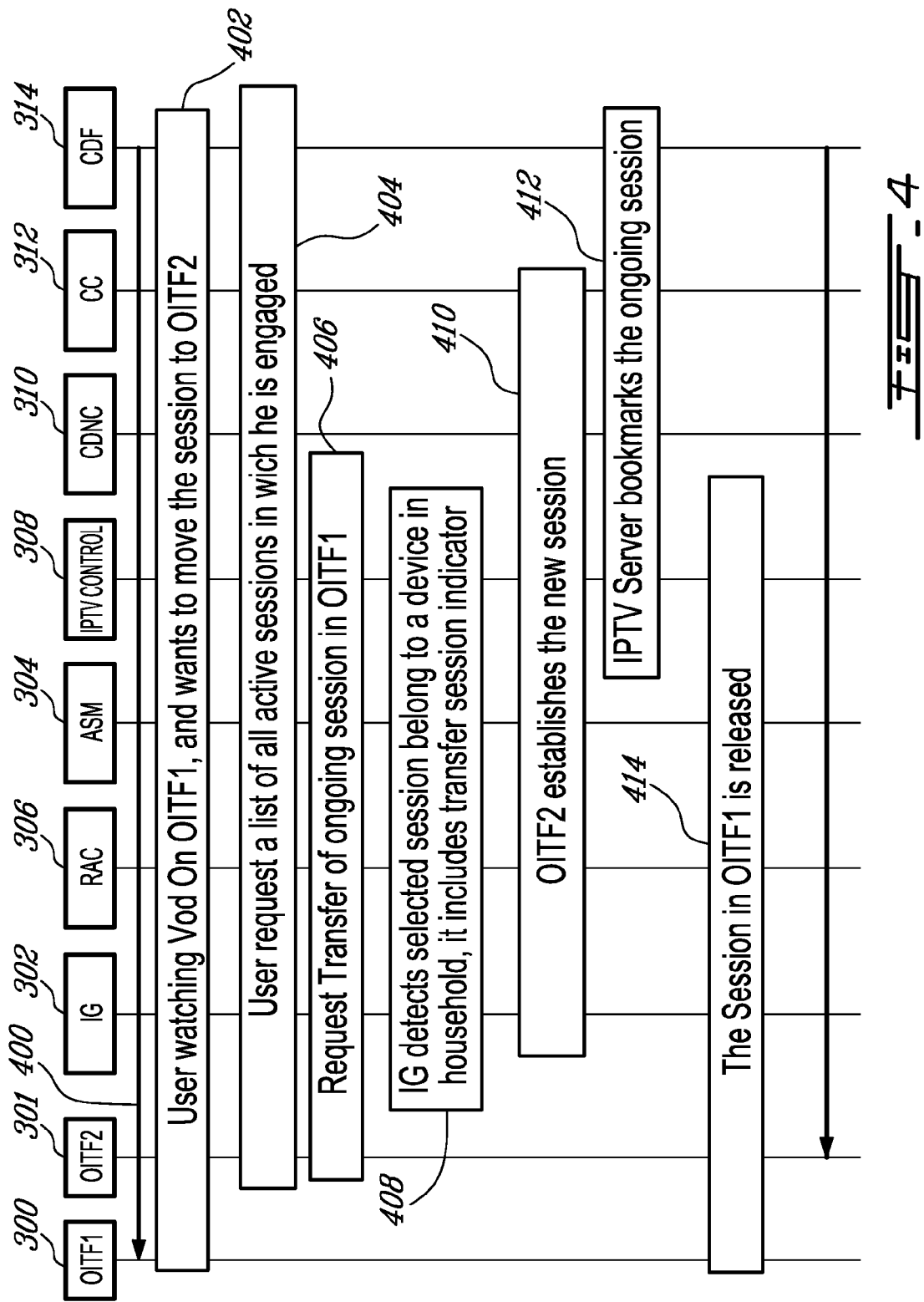
FIGS. 4 and 5 illustrate signaling associated with resuming or transferring a session according to an exemplary embodiment.

FIG. 4 illustrates exemplary signaling associated with this pull embodiment at a high level, a more detailed version of which is described below with respect to FIG. 5. In both FIGS. 4 and 5, the entities 300, 302, 304, 306, 308, 310, 312 and 314 themselves are the same as those described above with respect to FIG. 3, although different signaling occurs between some of those entities. A second OITF2 301 has also been added to FIGS. 4 and 5 to represent another end terminal device from which a program represented by arrow 400, first viewed (and potentially paused) at OITF 1 300, may be resumed. As shown by step 402, a user is initially watching, e.g., a VOD program, on OITF1 300 and wants to move the session to OITF2 301. That user can request, e.g., from OITF2 301, a list of all active IMS sessions that he or she has currently engaged in (some or all of which may be paused) at step 404. This may include sessions associated with fixed terminals or mobile devices. The user then selects one of the sessions from the list and requests transfer of that session at step 406. According to this exemplary embodiment, the IG 302 detects that the selected session to be transferred belongs to a device, i.e., OITF1 300 in this example, which is in the same household as the device to which the transfer is to be performed and, therefore, adds a transfer session indicator to the transfer request which it forwards through the network at step 408. A new IMS session is established with OITF2 302 at step 410 and the IPTV server bookmarks the ongoing session at step 412. In this context, the term "bookmarks" refers to a mechanism by which the IPTV server can mark or identify a specific point in time during the play out of a content item from a scheduled content service or a content on demand service. This combination of the identification of a content item and a particular point in time associated with the playout of the content item is referred to herein as "a bookmark". The first session, i.e., the one that the user was watching on OITF1 300 and which may or may not have been paused, can then be released as step 414.

Figure 5:
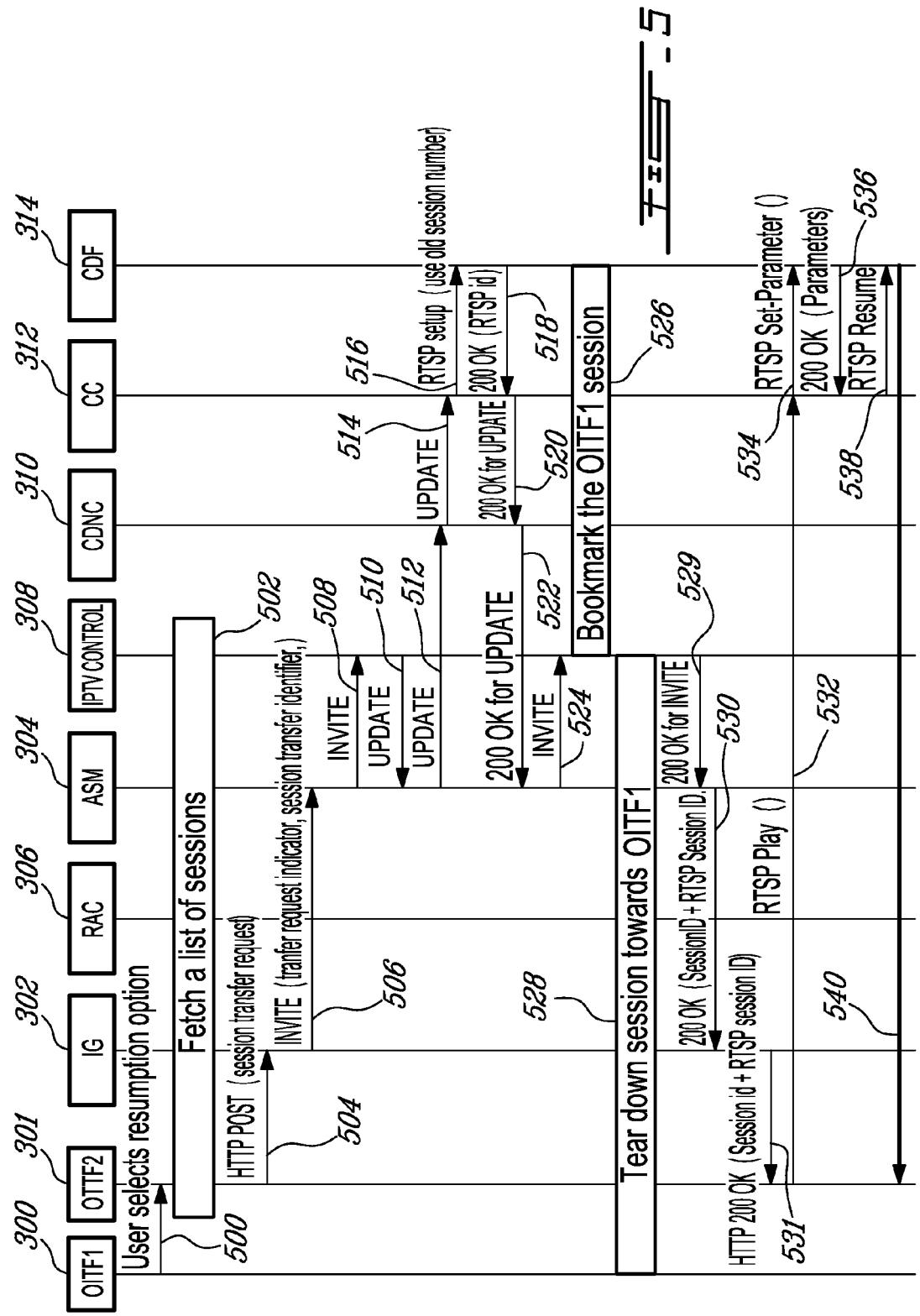

FIG. 5 illustrates the signaling associated with this exemplary embodiment in more detail. Therein, a user selects a session resumption option on his or her terminal device (OITF2 301), e.g., via a user interface option and/or remote control device. This resumption option results in a list of active sessions for the user being fetched from the IPTV control unit 308 corresponding to that IMS user as indicated by block 502, which list can, for example, be displayed by the OITF2 301 to permit selection of one of the sessions by the end user. The selected session is then requested to be transferred to OITF2 301 by transmitting an HTTP POST signal 504 from the OITF2 to the IG 302. Signal 504 includes a session transfer request that identifies the selected session. According to this exemplary embodiment, the IG 302 sends a SIP INVITE message 506 to the ASM entity 304 which includes a session transfer identifier, which identifies the session to be transferred, and a transfer request indicator, which informs the IMS network (and the P-CSCF in particular) that the session to be transferred is one which currently exists in the same household as the OITF2 301 to which it is to be transferred. Note that if the session to be transferred which was selected from the list did not correspond to a session which was currently active in the same household, then either the transfer request indicator could be omitted or it could have a different value. Given that the IG 302 tracks the states of all IMS sessions from all OITFs 300, 301 in the household, the IG 302 can make a determination if a session to be transferred belongs to an OITF in the same household or not, and as such insert the proper information in the SIP INVITE message 506.

Since, in this example, the INVITE signal 506 does include a transfer request indicator (or includes a transfer request indicator having a value which informs the IMS network that the associated session transfer request is to a device at the same household as the one which also has the session to be transferred), the ASM 304 does not need to contact the RAC entity 306 to reserve bandwidth for the to-be transferred session. Instead, ASM 304 proceeds to setup the to-be transferred session by contacting the IPTV control unit 308 which is associated with the identified session via SIP INVITE message 508. The IPTV portion of the network then updates the IMS session towards the CC, which in turn updates the RTSP session, to reflect the fact that the session is now in communication with a new device OITF2 for streaming the content. The IMS session update sets up the RTSP connection in a manner similar to that described above with respect to signals 311-329, via signals 510-522, as shown in FIG. 5 and, therefore, each of these signals will not be discussed individually. Note that, for example, a SIP UPDATE or re-INVITE message could be used for that purpose. Additionally, note that in this exemplary embodiment, it is assumed that the CDF 314 is capable of handling an RTSP setup message 516 which contains an old (i.e., associated with an active) session number. If the CDF 314 is not capable of handling this type of RTSP setup message, then alternative signaling may then be performed, as will be described below with respect to FIG. 10. However it should be noted that the CC 312 may, depending on the information provided to it in the UPDATE signal 514, choose a new CDF 314 and establish a new RTSP session. In such a case, the CC 312 binds the RTSP session id used by OITF1 300 and to be used by OITF2 301 with the new RTSP session id that will be returned from the RTSP session setup procedure.

Once the media portion of the network has concluded setting up the RTSP connection for the to-be transferred IMS session, the IMS network 304 can inform the IPTV control unit 308 via SIP INVITE message 524 which can, in turn, bookmark the OITF1 300's session to preserve the time state of the VOD (or other content) program, as indicated by block 526. Then, the IMS network can tear down the current IMS session for OITF1 300, as indicated by block 528, and use those resources to establish a new IMS session for OITF2. This information is communicated to the IG 302, along with the RTSP session ID, via 200 OK signals 529 and 530 which, in turn, informs OITF2 301 via HTTP 200 OK signal 531. The OITF2 301 can then request that the media be resumed via RTSP Play signal 532 being sent to the CC 312 which completes resumption of the media stream via signals 534-538, after which the CDF 314 delivers the media 540 back through the network to terminal 301. As mentioned above, although this example is described in the context of resuming the media 540 on a second terminal 301 which is different than the first terminal 300, it will be appreciated that the same or similar signaling could be used to resume the media on the same terminal as that on which the media or session was paused.

As mentioned above, the provision of the transfer request indicator enables the IMS system to recognize that it need not pre-allocate bandwidth to transfer an IMS session between terminals which share the same access, e.g., terminals within the same household. However, provision of such an indicator would necessitate a change to the IMS specifications as they are currently formulated since such an indicator does not exist today. Another option for handling this issue, according to another exemplary embodiment, is to send the INVITE signal

506 without the transfer request indicator. Instead, when the ASM entity 304 receives the INVITE signal 506 with the session transfer identifier, the P-CSCF would check to see if it has the state of a session that includes such a session transfer identifier and, if so, whether that session belongs to the same access point (e.g., by checking the IP addresses). If so, the P-CSCF can then bypass the IMS resource reservation phase in the manner described above, without requiring the change to the IMS specifications that the addition of the transfer request indicator would impose in the above-described exemplary embodiment. This type of embodiment is referred to herein as transmitting an indication implicitly to the network that it need not reserve bandwidth initially for the to-be setup session, as opposed to the previous exemplary embodiments which provide for an explicit indication to be transmitted.

Thus, according to another exemplary embodiment, a pull session transfer mechanism between IMS terminals is provided but without signals that would need a modification to the IMS specification, which exemplary embodiment will now be discussed with respect to FIGS. 6 and 7. Starting with FIG. 6, which illustrates this exemplary embodiment at a higher level, the first four steps 600-606 are the same as steps 400-406 in FIG. 4. However, in step 608, instead of including the transfer session indicator as in step 408, the IG 302 puts the OITF1 300's incoming media on hold when it detects that the session to-be transferred belongs to a device located in the same household. The media delivery portion of the system then bookmarks the session at step 610 since the session is now on hold, and the IG can then release the resources for OITF1 300 at step 612. A new session is then established for OITF2 301 at step 614 and the IMS session for OITF1 300 can be released at step 616. The resumed media, e.g., a VOD program, is provided to the second terminal OITF2 301 as shown by arrow 618.

Figure 7A:
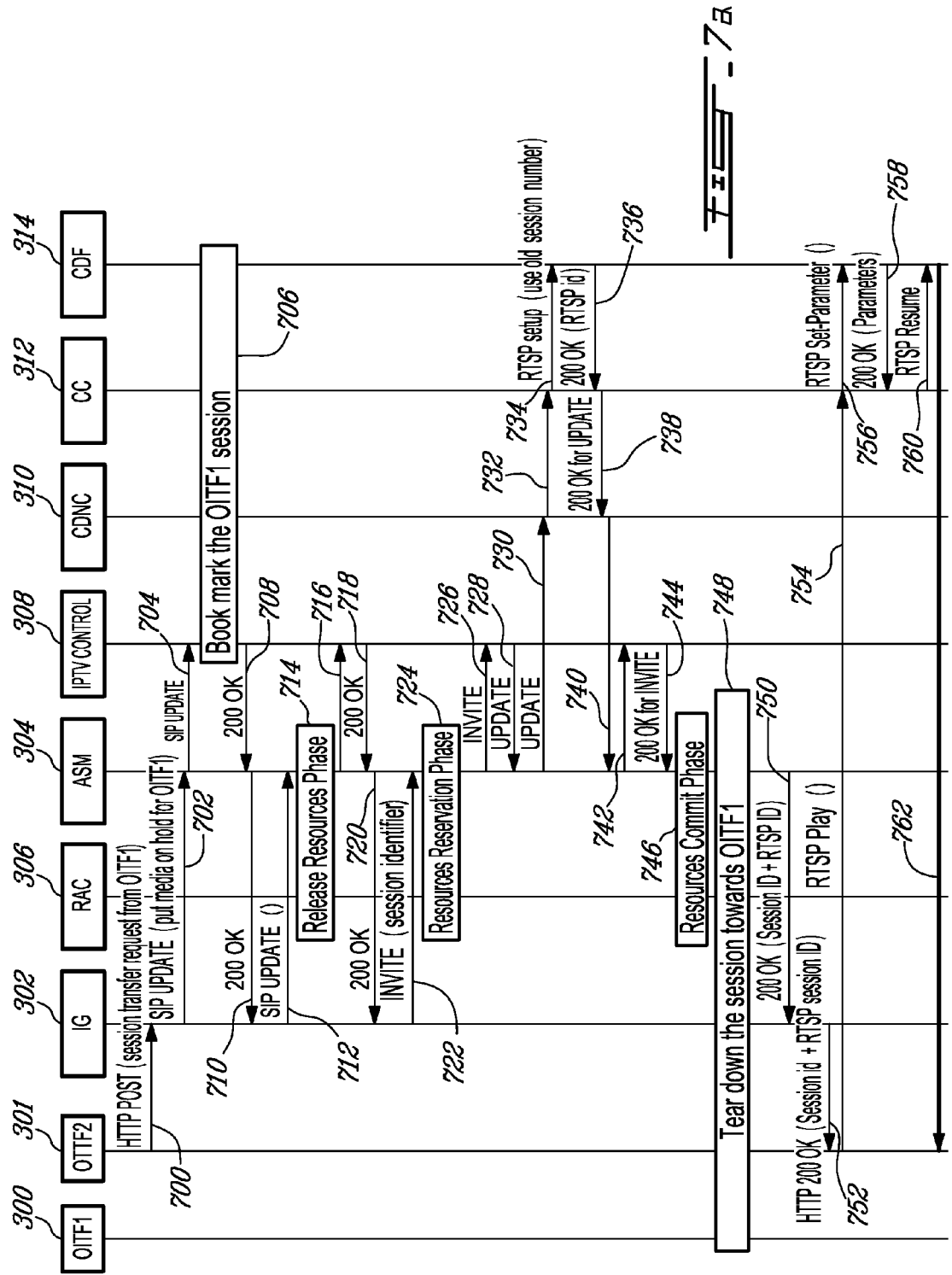
Figure 7C:
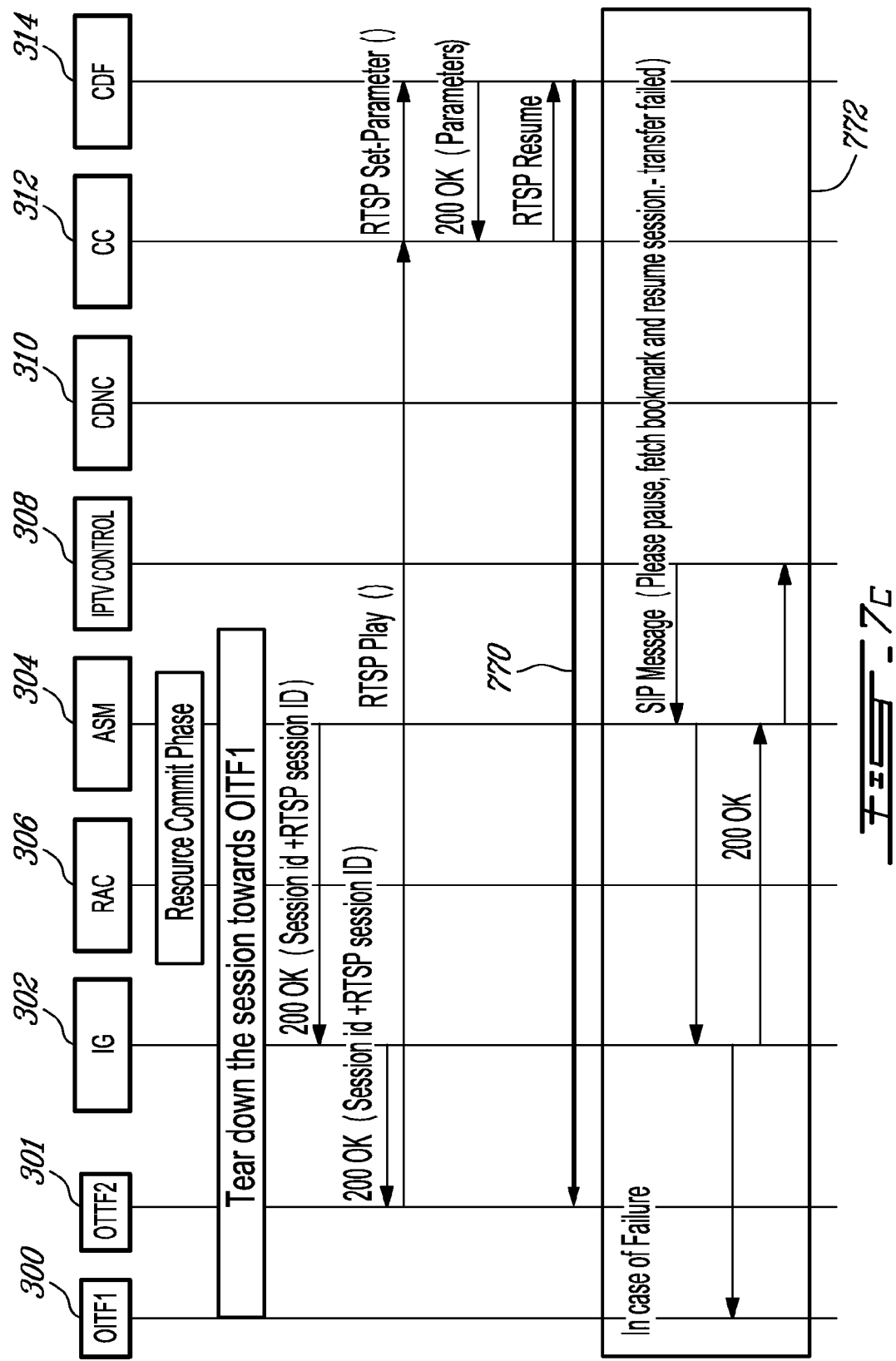

A more detailed, but still exemplary, signaling diagram which can be used to implement the embodiment of FIG. 6 is provided as FIG. 7(*a*). Therein, the signaling begins at the point in time after the initial IMS session is established and the user has selected a session to be transferred to the second OITF2 301. The OITF2 301 indicates the desire to transfer this session by transmitting the HTTP POST message 700 toward IG 302. The IMS gateway 302, in turn, once it determines that the selected session belongs to a device in the same household, puts the existing session on hold by transmitting the SIP UPDATE signal 702 to the ASM entity 304, which forwards the request on to the IPTV control server 308. Upon receiving the request to put the existing session with OITF1 300 on hold, the media delivery portion of the network will bookmark that session (as shown by block 706) to preserve the time state of the corresponding media content which was being delivered to that terminal. After it receives acknowledgement via signals 708 and 710 that the session has been placed on hold, the IG 302 will releases resources for the OITF1 300 to make them available for OITF2 (via signals 712-720) prior to reserving those resources for the new session for OITF2 301.

The IG 302 then initiates the resources reservation phase 724 by transmitting SIP INVITE message 722 including the session identifier of the session to-be transferred. This phase 724 includes the same (or substantially the same) signaling by way of signals 726-744 as the signaling described above with respect to FIG. 5 and signals 508-526, respectively, so that an individualized description of those signals in FIG. 7(*a*) will not be repeated here. At that time, the resources can be committed for the new session to OITF2 301 and the old session toward OITF1 300 can be torn down, as shown by blocks 746 and 748, respectively. The OITF2 301 can be informed that the new session is ready, via signals 750 and 752, and then the media associated with the session to be resumed can be transmitted to OITF2 301 as shown by signals 754-762. As mentioned earlier this latter exemplary embodiment provides a mechanism for resuming an IMS session, and corresponding content on delivery, which still enables the system to avoid reserving bandwidth unnecessarily, but without changing the existing IMS specification. According to this exemplary embodiment, if the OITF1 300 runs out of content to output (e.g., while its media has been placed on hold) the OITF1 300 may issue an RTSP Pause command to allow this session to be resumed if the transfer to OITF2 301 fails. Alternatively, the other exemplary embodiment described above can be utilized, wherein the IG 302 also sends a media on hold message to OITF1 300 to make sure that the OITF1 300 issues an RTSP pause and avoids this situation.

According to another exemplary embodiment, the IG 302 puts the media on hold both for OITF1 300 and the CDF 314. When OITF1 300 receives the media on hold update signal, it pauses output of the stream to the user. An exemplary signaling diagram associated with this exemplary embodiment is shown in FIGS. 7(*b*) and 7(*c*). Therein signaling which is the same as or similar to that discussed above with respect to the exemplary embodiment of FIG. 7(*a*) is unnumbered and not described here to simplify the discussion, however the interested reader is referred to the earlier text for a discussion of those signals. If the session selected for resumption belongs, e.g., to the same household, the IG 302 puts media on hold both in the network and OITF1 300 according to this exemplary embodiment, which has the side effect of bookmarking the session in the network and the forcing OITF1 300 to send an RTSP pause message 763. The network sends a notification to the old device to advise it of an ongoing transfer via messages 764, 766 and 768. The IG 302 then releases resources (block 769) for the OITF1 300 to make them available for OITF2 301. The signals illustrated below the release resource phase block continuing on FIG. 7(*c*) and up until the media is delivered to OITF2 301 at step 770 are similar to the corresponding signals and steps described in FIG. 7(*a*). Block 772 depicts exemplary signaling associated with a transfer failure and could be performed in lieu of signals 764 et seq. in the event of such a failure. Note that, as with the exemplary embodiment of FIG. 7(*a*), the exemplary embodiment of FIGS. 7(*b*) and 7(*c*) also does not require any changes to the IMS specification as currently formulated.

These latter exemplary embodiments describe pull mechanisms for resuming IMS sessions and corresponding media delivery at the same, or different, terminals within a household. Another exemplary embodiment will now be described, with respect to FIGS. 8 and 9(*a*)-9(*c*), which provides a similar functionality as a push mechanism, i.e., wherein the first terminal "pushes" its session to a second terminal rather than the second terminal "pulling" the session from the first terminal. As with the previous exemplary embodiments, this exemplary push mechanism is first described in FIG. 8 at a higher level, starting with transmission of the media content 800 to the first terminal represented by OITF1 300. Unlike the exemplary pull mechanisms described above, in this exemplary embodiment the user requests a list of the OITFs, or other IMS devices, where that user is registered via the first OITF1 300 at step 802. Once he or she reviews this list, e.g., by way of a user interface object displayed by the OITF1 300 on the first terminal device, he or she can select the transfer of one of the listed sessions to OITF2 301 at step 806. Various signaling mechanisms can be used to perform this transfer, e.g., using an explicit transfer request indicator to indicate to the IMS network that resource allocation can be delayed or implicitly indicating this by first putting the requested media on hold, as shown generally by step 808. The media delivery portion of the network is then informed that the user session is to be transferred to OITF2 301 at step 810, resulting in a bookmarking of that session and clearing of the old session at step 812. The media path is updated at step 814 and then opened (steps 816 and 818) to prepare the way for delivery of the media to the second terminal 301 as indicated by the arrow 820.

Figure 8:
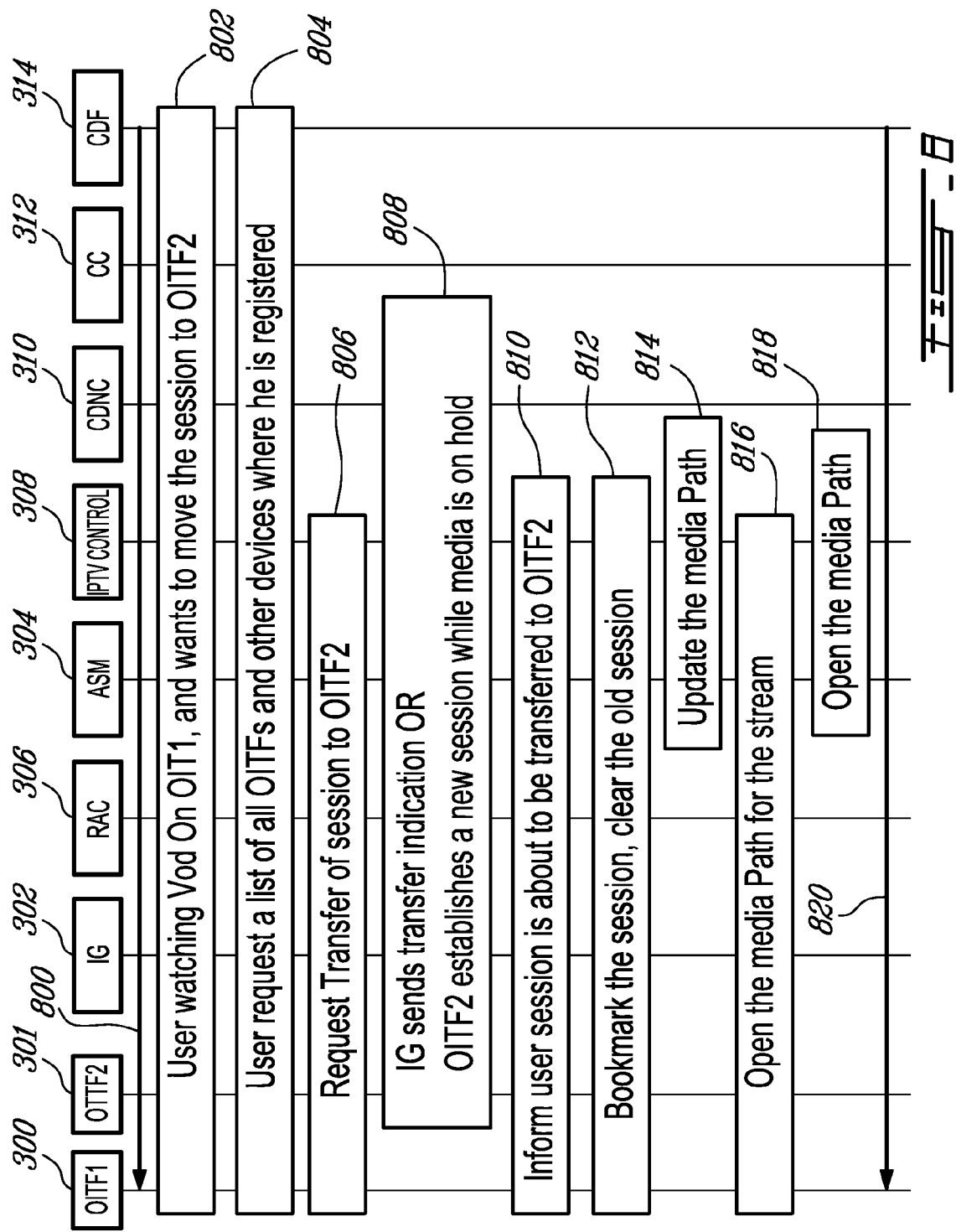
FIGS. 8 and 9(*a*)-9(*c*) illustrate signaling associated with resuming or transferring a session according to another exemplary embodiment.
Figure 9A:
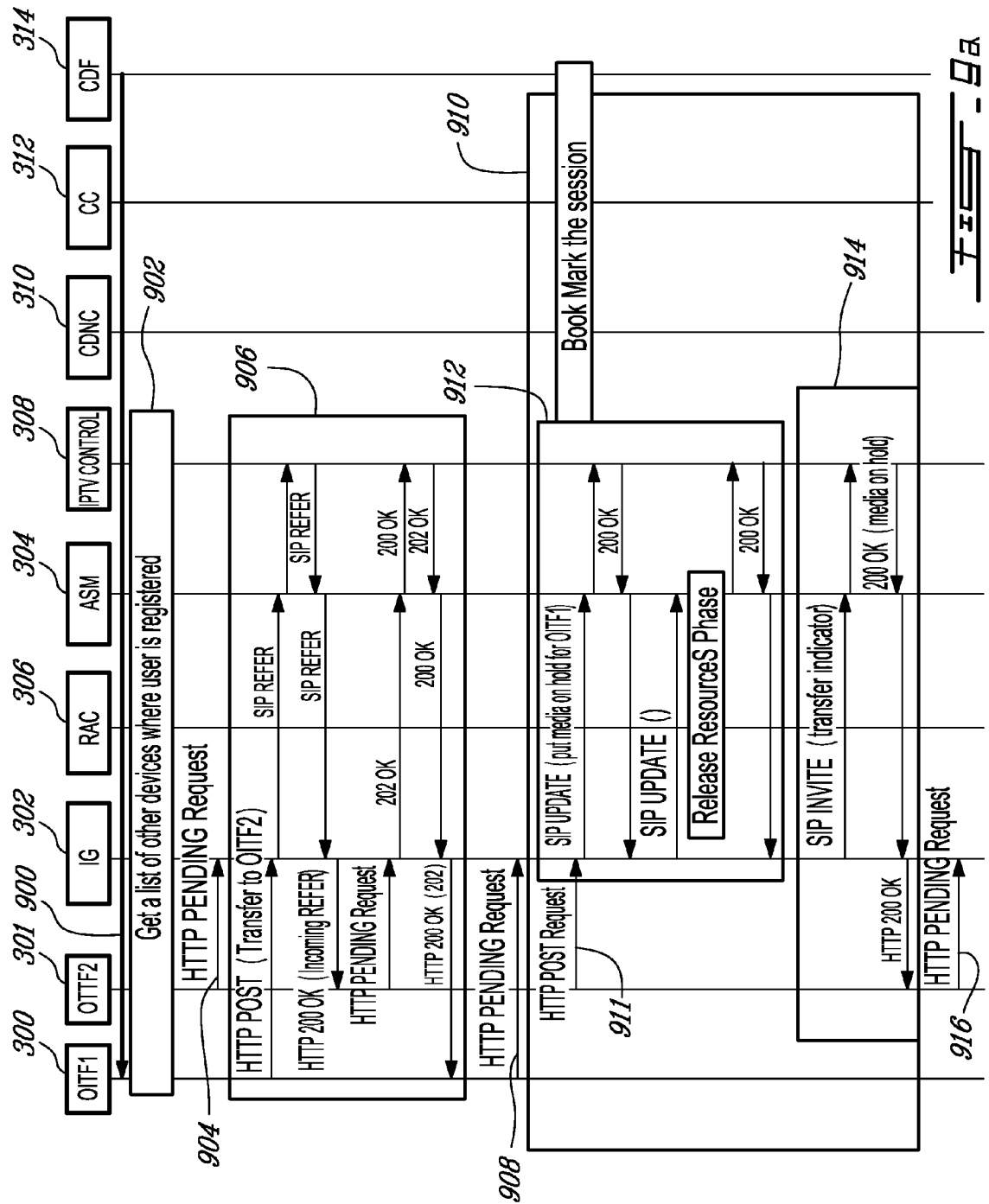
Figure 9B:
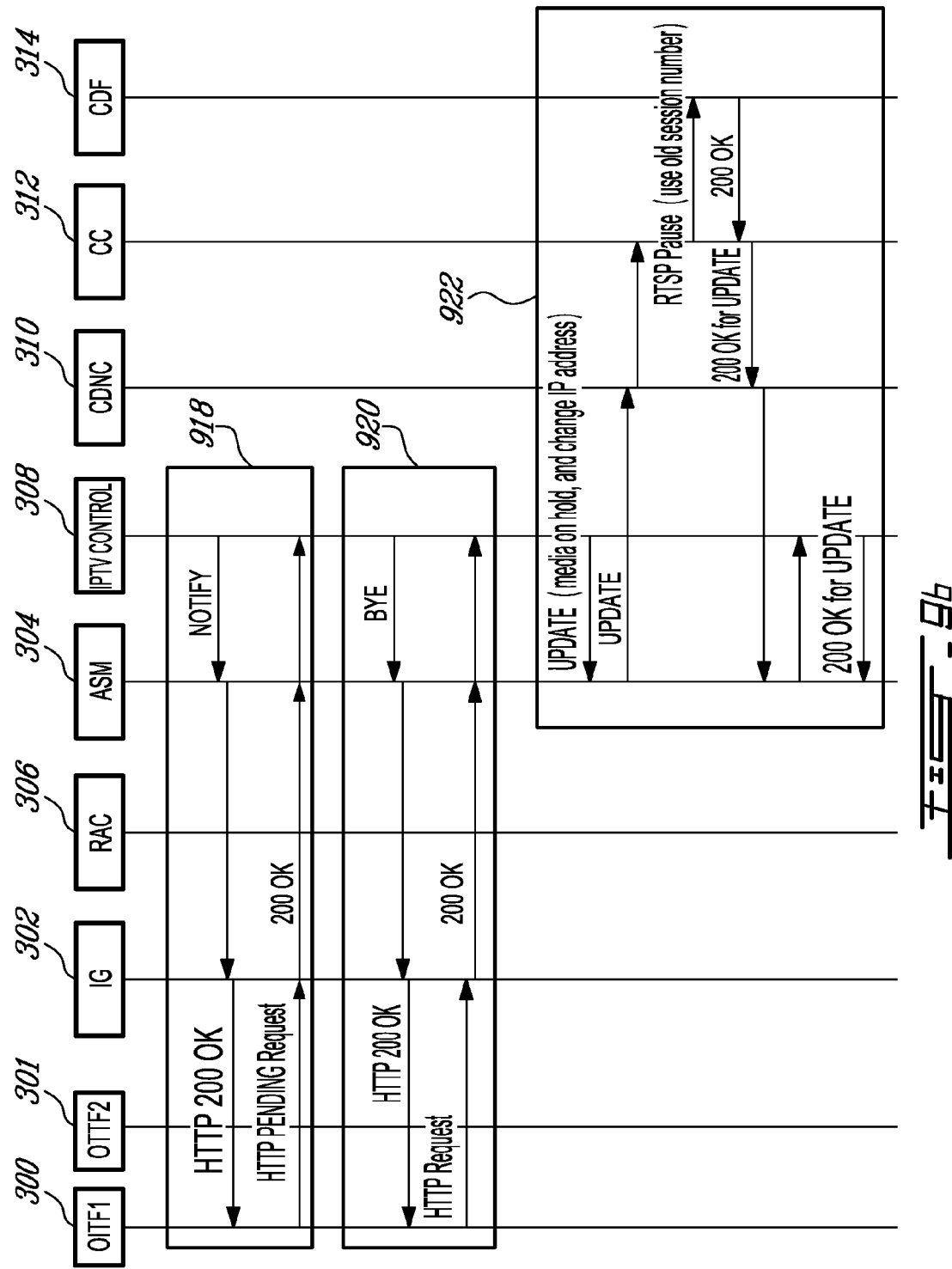
Figure 9C:
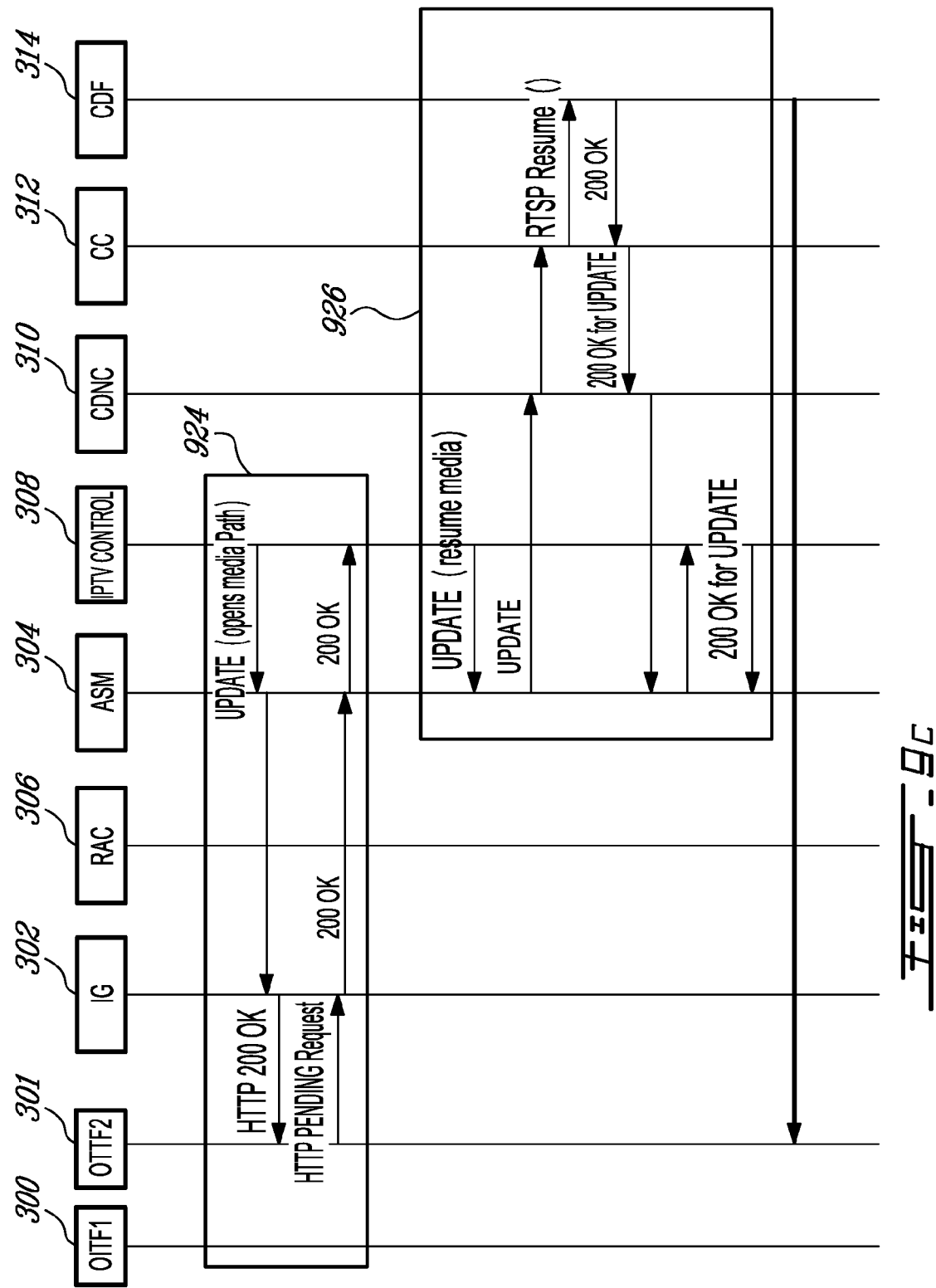

A more detailed signaling diagram associated with the exemplary push embodiment of FIG. 8 is seen in FIGS. 9(*a*)-9(*c*). Therein, the media associated with a first IMS session is initially being transmitted through the network to OITF1 300, as represented by arrow 900. The OITF1 obtains a list of other IMS devices where the user is registered at block 902. HTTP Pending Request signal 904 (as well as similar signals 908 and 916) provide for proper operation of the HTTP protocol between the IG 302 and the OITFs to ensure that any incoming information to the IG 302 and destined for one of the OITFs 300, 301 is sent to the appropriate OITF since the IG 302 cannot initiate HTTP requests according to this exemplary embodiment. Hence the OITF 300 or 301 sends an HTTP Pending Request so that any asynchronous information for the OITF 300 or 301 can be sent to it in the response. The exemplary signals illustrated in block 906 can be used to request the transfer of the existing session to OITF2 301. The block 910 of signals illustrates signaling associated with two of the alternatives mentioned with respect to step 808 above.

More specifically, once an HTTP POST request is received from the OITF2 301, the IG 302 can either (according to these exemplary embodiments) perform the signaling shown in block 912 or the signaling shown in block 914 to inform the IMS network that the new session should be established without initially reserving bandwidth for that session. Blocks 912 and 914 represent signaling associated with the implicit and explicit exemplary embodiments discussed above with respect to FIGS. 7(*a*) and 5, respectively. However, it will further be appreciated that the option described above with respect to FIGS. 7(*b*) and 7(*c*) relating to putting the media on hold both at the network and at the OITF1 300 could likewise be implemented as an alternative to blocks 912 and 914. The subsequent signaling to RAC 306 is omitted from FIG. 9(*a*) to simplify the figure. Exemplary signaling to perform steps 810, 812 and 814 in FIG. 8 is illustrated in blocks 918, 920 and 922, respectively, in FIG. 9(*b*). Similarly, exemplary signaling to perform steps 816 and 818 in FIG. 8 is illustrated in blocks 924 and 926, respectively, in FIG. 9(*c*).

The foregoing exemplary embodiments support, for example, various mechanisms for an IPTV service provider to duplicate an existing service session on another ITF. For inter-ITF service session duplication, this may apply primarily to VoD or CoD types of programs. For service session duplication to devices outside the home, this may apply to scheduled content as well. It will be appreciated by those skilled in the art that various acknowledgement signals, etc., have been omitted to simplify the signalling diagrams. Although in some cases a user might pause the media stream at the first terminal prior to transferring that session to another terminal, pausing is not required.

The foregoing exemplary embodiments show signaling wherein RTSP setup is performed for the to-be transferred session by reusing the old RTSP session number. Alternatively, the CC 312 may select a new CDF 314 and establish a brand new RTSP session. Still another option is shown in the exemplary embodiment of FIG. 10. In this example, the signaling prior to establishment of the RTSP session for the to-be transferred IMS session has been omitted to simplify the diagram. The call flow continues at the point where the CC 312, upon receipt of a SIP UPDATE message 980, sends an RTSP setup message 1000 using the old session number (associated with the program at OITF1) in an attempt to update the transport stream. In this case, the setup fails as shown by the error message 1002, because the CDF 314 does not support the capability to change the transport stream. Thus, the CC 312 sets up a new RTSP session via signals 1004 and 1006. The CC 312 maintains a binding between the new session and its own RTSP session towards the OITF2 301. The CC 312 also clears up the old RTSP session but copies the range and other pertinent information before clearing the session (the step of copying is not shown in the flow). Following that, the CC 312 returns the response to the UPDATE and call flow resumes until the session is successfully established. Finally, the OITF2 301 issues an RTSP resume signal 1008 to the CC 312. The CC 312 inserts a range value into the RTSP resume signal so that the program can be resumed at the proper point in time before forwarding the request to the CDF 314. Note that, unlike previous exemplary embodiments, this exemplary embodiment provides for tearing down of the old session after media is provided to the OITF2 301 (as represented by arrow 1010).

The foregoing exemplary embodiments describe session transfer from one terminal to another, whereby content being watched can be paused or stopped on one terminal and then resumed for viewing on a second terminal. In such examples, after the transfer occurs, the old session is cleared. However, as mentioned briefly above, other exemplary embodiments can use similar techniques and call flows to support the provision of a copy of the same session being viewed at the first terminal to the second terminal. For example, if the user is watching a VoD program with a group of friends in his or her living room on one television and then moves to the kitchen to prepare a meal, he or she might want to copy the session to a television in the kitchen while allowing it to continue running on the television in the living room. In such embodiments, the old session is not cleared after the session is copied to the second terminal.

As described above, the IPTV control server 308 is the node that is responsible for clearing the first session when a session transfer is to be performed. According to this embodiment, information can therefore be passed to the IPTV control server 308 which enables it to know whether it is to transfer the session to another terminal (with session clearing) or to copy the session to another terminal (without session clearing). In the context of the foregoing exemplary embodiments, session copying can be added to session transferring as follows.

For example, with respect to the exemplary embodiment of FIG. 5, step or signal 504 can be modified to include either a session transfer indicator (denoting replacement of the old session with the new), or a copy indicator (denoting that the old session should be maintained). The indicator is transported in the SIP INVITE message in 506 and promulgated onwards through the system as shown in the figure. If the indicator is a copy indicator, then the P-CSCF will operate normally, since the existing session need not be torn down and, when the indicator reaches the IPTV control server 308, it will omit the tear down phase 528.

Regarding the exemplary embodiment of FIG. 7(*a*), this embodiment can also be modified to permit either session transfer or session copying by passing, in step/signal 700, either a session transfer indicator (replace), or a copy indicator (and also in the SIP INVITE message 722 as well). If the indicator is a session transfer indicator (replace), then the rest of the call flow remains as shown in FIG. 7(*a*). If, however, the indicator is a copy indicator, then the IG 302's behavior changes slightly. More specifically, signals 702-710 are performed as shown in FIG. 7(*a*), but the IG 302 needs to open the media again after that by repeating the same steps 702 to 710 again to resume the media (however in this case no bookmarking is needed). Steps/signals 712-720 are then omitted when the indicator is a copy indicator and the P-CSCF ignores the copy indicator. The copy indicator is passed to the IPTV control server 308 which then knows not to clear the session, such that block 748 is omitted.

Regarding the exemplary embodiment of FIGS. 7(*b*) and 7(*c*), this embodiment can also be modified to permit either session transfer or copying by passing, the initial (unnumbered) HTTP POST signal. This indicator is carried in the SIP INVITE message and onwards. If the indicator is a session transfer indicator (replace), then the rest of the call flow remains as shown in these figures. If the indicator is a copy indicator, then the IG 302's behavior changes slightly. As with the modified version of the embodiment of FIG. 7(*a*) in the previous paragraph, the IG 302 will need to repeat the steps used to open the media flow a second time and without bookmarking the session. Again, the P-CSCF will ignore copy indicators, which are then passed on to the IPTV control server so that it knows not to clear the session. Similar modifications can also be made to the exemplary embodiment of FIG. 9.

From the foregoing, it will be appreciated that sessions can be resumed (on the same or a different terminal), transferred (to a different terminal) or copied (to a different terminal, while continuing also on the initial terminal. To the extent that a generic term is needed to encompass all three of these types of session management, the terms "replicate", "replicating", "replication", and the like are defined for the purposes of this specification to mean resuming, transferring or copying a session in the manner described with respect to any of the foregoing exemplary embodiments, inclusive of same and different terminals.

Based on the foregoing examples, it will be appreciated that a method for resuming, transferring or copying an IMS session and corresponding media delivery according to an exemplary embodiment can be expressed as illustrated in the flowchart of FIG. 11. Therein, at step 1100, media associated with an IMS session initiated via an IMS gateway, is transmitted toward a first terminal. A request is received by the IMS gateway to resume, transfer or copy the IMS session at step 1102. The IMS gateway determines at step 1104 that the IMS session is to be resumed, transferred or copied to a second terminal which is associated with the first terminal. At step 1106, the IMS gateway transmits an indicator, which is one of a session transfer indicator and a copy indicator, toward an IMS network. Thus, it will be apparent that exemplary embodiments also relate to software, e.g., program code or instructions which are stored on a computer-readable medium and which, when read by a computer, processor or the like, perform certain steps associated with transmitting information signals which are described above.

Moreover, systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. For example, FIG. 12 illustrates a node, e.g., an IMS gateway or other node, which can be used to implement these exemplary embodiments. Therein, the node 1200 can contain a processor 1202 (or multiple processor cores), memory 1204, one or more secondary storage devices 1206 and a communications interface 1208 to facilitate communications with itself and the rest of the network(s). Processor 1202 and interface 1208 can also perform the various functions and signaling for session establishment and selective bandwidth reservation described above. The node of FIG. 12 can also represent, for example, a content controller 312. In such an implementation, the memory 1204 can be used to store a first session identity, e.g., an RTSP identity, associated with a media session, a content identity, e.g., identifying a VoD program which has been paused, and a time reference, e.g., identifying the point in the VoD program at which it has been paused. If a different RTSP session needs to be setup to support resumption of the program, e.g., because the second terminal on which the program is to be resumed has different capabilities than the first terminal, then the second session identity can be associated with the first session identity by storing a binding between the two identities in the memory 1204.

Relative to this latter embodiment, a method for resuming a media session can also be described as shown in the flowchart of FIG. 13. Therein, at step 1300, a first session identity, a content identity and a time reference associated with a media session are stored, e.g., in a content controller 312's memory unit. This storage of items can happen at different times, e.g., during the initial playout of the content to be resumed later. A command to replicate the session is received at step 1302, whereupon the receiving node selects one of an old content server, i.e., the server which previously supported the media session, and a new content server to support replication of the media session, as shown by step 1304. A replication message, including the content identity and the time reference, is transmitted to the selected server at step 1306. The session identity, e.g., RTSP session identity, may also be included in the replication message or, as described above, a new session identity may be used in which case the node stores a binding or association between the two session identities.

It will be appreciated that terminals between which sessions can be resumed according to these exemplary embodiments could be located within the same household, could include one or more mobile terminals or could be located in different destinations as long as they possess an IMS capability by themselves or through connection to an IMS gateway.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

What is claimed is:

1. A method for replicating a media session comprising:
    storing a first session identity, a content identity and a time reference associated with said media session;

receiving a command to resume said media session;
selecting one of: a content server which previously supplied content associated with said media session and a new content server, to replicate said media session; and
transmitting a replication message including said content identity and said time reference toward said selected server which informs said selected server of replication of said media session and to instruct the selected server to bypass the resource reservation process associated with establishing a new media session.

2. The method of claim 1, wherein said replication message also includes said first session identity.

3. The method of claim 2, further comprising the steps of:
receiving, in response to said replication message, an indication that said selected content server cannot set up a new session using said first session identity;
transmitting, in response to said indication, a second session identity; and
associating said second session identity with said first session identity.

4. The method of claim 1, wherein said replication message includes a second session identity and further comprising:
associating said second session identity with said first session identity.

5. The method of claim 1, wherein said first session identity is a Real Time Streaming Protocol (RTSP) identity.

6. A system comprising:
a first node including:
a memory device for storing a first session identity, a content identity and a time reference associated with a media session; and
a processor for:
receiving a command to resume said media session,
selecting one of: a content server which previously supplied content associated with said media session and a new content server, to resume said media session, and
transmitting a replication message including said content identity and said time reference toward said selected server which informs said selected server of replication of said media session and to instruct the selected server to bypass the resource reservation process associated with establishing a new media session.

7. The system of claim 6, wherein said replication message also includes said first session identity.

8. The system of claim 7, wherein said processor receives, in response to said replication message, an indication that said selected content server cannot set up a new session using said first session identity, transmits, in response to said indication, a second session identity, and associates said second session identity with said first session identity.

9. The system of claim 6, wherein said replication message includes a second session identity wherein said processor associates said second session identity with said first session identity.

10. The system of claim 6, wherein said first session identity is a Real Time Streaming Protocol (RTSP) identity.

11. The system of claim 6, further comprising:
said content server which previously supplied content associated with said media session; and
said new content server.

12. A method for replicating a media session comprising:
storing a first session identity, a content identity and a time reference associated with said media session;
receiving a command to resume said media session;
selecting one of: a content server which previously supplied content associated with said media session and a new content server, to replicate said media session;
transmitting a replication message including said content identity, the first session identity, and said time reference toward said selected server which informs said selected server of replication of said media session
receiving, in response to said replication message, an indication that said selected content server cannot set up a new session using said first session identity;
transmitting, in response to said indication, a second session identity; and
associating said second session identity with said first session identity.

13. A system comprising:
a first node including:
a memory device for storing a first session identity, a content identity and a time reference associated with a media session; and
a processor for:
receiving a command to resume said media session,
selecting one of: a content server which previously supplied content associated with said media session and a new content server, to resume said media session,
transmitting a replication message including said content identity, the first session identity and said time reference toward said selected server which informs said selected server of replication of said media session
receiving, in response to said transmitted replication message, an indication that said selected content server cannot set up a new session using said first session identity;
responsive to receiving the indication, transmitting a second session identity; and
associating the second session identity with the first session identity.

* * * * *

UNITED STATES PATENT AND TRADEMARK OFFICE
CERTIFICATE OF CORRECTION

PATENT NO. : 8,392,501 B2  
APPLICATION NO. : 13/220173  
DATED : March 5, 2013  
INVENTOR(S) : Foti Page 1 of 3

It is certified that error appears in the above-identified patent and that said Letters Patent is hereby corrected as shown below:

On the Title Page, in the Figure, for Tag "301", in Line 1, delete "OTTF2" and insert -- OITF2 --, therefor.

On the Title Page, in the Figure, for Tag "612", in Line 1, delete "ressources" and insert -- resources --, therefor.

On the Title Page, in Item [56], under "OTHER PUBLICATIONS", in Column 2, Line 2, delete "1998." and insert -- 1998, --, therefor.

On the Title Page, in Item [56], under "OTHER PUBLICATIONS", in Column 2, Line 4, delete "2002." and insert -- 2002, --, therefor.

On the Title Page, in Item [56], under "OTHER PUBLICATIONS", in Column 2, Line 7, delete "2006." and insert -- 2006, --, therefor.

On the Title Page, in Item [56], under "OTHER PUBLICATIONS", in Column 2, Line 10, delete "2007.pp." and insert -- 2007, pp. --, therefor.

On Title Page 2, in Item [56], under "OTHER PUBLICATIONS", in Column 1, Line 3, delete "2006." and insert -- 2006, --, therefor.

In the Drawings:

In Fig. 4, Drawing Sheet 4 of 17, for Tag "404", in Line 1, delete "wich" and insert -- which --, therefor.

In Fig. 5, Drawing Sheet 5 of 17, for Tag "506", Line 1, delete "(tranfer" and insert -- (transfer --, therefor.

Signed and Sealed this  
Third Day of September, 2013

Teresa Stanek Rea  
*Acting Director of the United States Patent and Trademark Office*

In Fig. 5, Drawing Sheet 5 of 17, for Tag "530", Line 1, delete "Session ID." and insert -- Session ID.) --, therefor.

In Fig. 6, Drawing Sheet 6 of 17, for Tag "301", in Line 1, delete "OTTF2" and insert -- OITF2 --, therefor at each occurrence throughout the figures.

In Fig. 6, Drawing Sheet 6 of 17, for Tag "612", in Line 1, delete "ressources" and insert -- resources --, therefor.

In Fig. 7b, Drawing Sheet 8 of 17, for Tag "769", in Line 1, delete "Ressources" and insert -- Resources --, therefor.

In Fig. 8, Drawing Sheet 10 of 17, for Tag "802", in Line 1, delete "OIT1," and insert -- OITF1, --, therefor.

In Fig. 9a, Drawing Sheet 11 of 17, for Tag "912", in Line 4, delete "ResourceS" and insert -- Resources --, therefor.

In Fig. 11, Drawing Sheet 15 of 17, for Tag "1104", in Line 2, delete "TRANSFERED" and insert -- TRANSFERRED --, therefor.

In Fig. 11, Drawing Sheet 15 of 17, for Tag "1106", in Line 1, delete "WICH" and insert -- WHICH --, therefor.

In Fig. 11, Drawing Sheet 15 of 17, for Tag "1106", in Line 2, delete "TRANFER" and insert -- TRANSFER --, therefor.

In the Specifications:

In Column 1, Line 16, delete "Terminal'"" and insert -- Terminal", --, therefor.

In Column 1, Line 19, delete "12/355,351" and insert -- 12/355,351, --, therefor.

In Column 1, Line 42, delete "7)'"" and insert -- 7)'" --, therefor.

In Column 5, Line 47, delete "(RSTP)" and insert -- (RTSP) --, therefor.

In Column 6, Line 35, delete "along" and insert -- long --, therefor.

In Column 7, Line 29, delete "302" and insert -- 301 --, therefor.

In Column 10, Lines 13-14, delete "utilitized," and insert -- utilized, --, therefor.

CERTIFICATE OF CORRECTION (continued)
U.S. Pat. No. 8,392,501 B2

In the Claims:

In Column 16, Line 20, in Claim 12, delete "session" and insert -- session; --, therefor.

In Column 16, Lines 41-42, in Claim 13, delete "session" and insert -- session, --, therefor.